(12) United States Patent
Aoki et al.

(10) Patent No.: US 7,407,182 B2
(45) Date of Patent: Aug. 5, 2008

(54) VEHICLE OCCUPANT PROTECTION DEVICE

(75) Inventors: Takashi Aoki, Wako (JP); Hirofumi Totsuka, Wako (JP); Yuichi Saito, Hagagun (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 11/231,229

(22) Filed: Sep. 20, 2005

(65) Prior Publication Data

US 2006/0061075 A1   Mar. 23, 2006

(30) Foreign Application Priority Data

| Sep. 22, 2004 | (JP) | 2004-275535 |
| Sep. 22, 2004 | (JP) | 2004-275550 |
| Sep. 22, 2004 | (JP) | 2004-275579 |
| Sep. 22, 2004 | (JP) | 2004-275603 |
| Sep. 22, 2004 | (JP) | 2004-275636 |
| Sep. 22, 2004 | (JP) | 2004-275740 |
| Sep. 22, 2004 | (JP) | 2004-275766 |
| Sep. 22, 2004 | (JP) | 2004-275811 |

(51) Int. Cl.
*B60R 21/21* (2006.01)

(52) U.S. Cl. ............... 280/730.2; 280/728.1; 280/728.2; 280/728.3; 280/730.1; 280/743.1; 280/749

(58) Field of Classification Search ............... 280/728.1, 280/728.2, 728.3, 730.1, 730.2, 743.1, 749
See application file for complete search history.

(56) References Cited

U.S. PATENT DOCUMENTS

| 6,357,789 | B1 * | 3/2002 | Harada et al. | 280/730.2 |
| 6,520,533 | B2 * | 2/2003 | Tanase et al. | 280/730.2 |
| 6,565,116 | B1 * | 5/2003 | Tajima et al. | 280/730.2 |
| 6,612,608 | B2 * | 9/2003 | Schmidt et al. | 280/728.3 |
| 2001/0019201 | A1 * | 9/2001 | Masuda et al. | 280/730.2 |
| 2001/0035633 | A1 | 11/2001 | Kobayashi et al. | |
| 2002/0024202 | A1 * | 2/2002 | Kubota et al. | 280/730.2 |
| 2002/0036395 | A1 * | 3/2002 | Bakhsh et al. | 280/730.2 |
| 2002/0195802 | A1 * | 12/2002 | Kamm et al. | 280/730.1 |
| 2002/0195803 | A1 * | 12/2002 | Terbu et al. | 280/730.2 |
| 2003/0141708 | A1 * | 7/2003 | Enders | 280/730.2 |

FOREIGN PATENT DOCUMENTS

| GB | 2 394 921 | 5/2004 |
| GB | 2 399 548 | 9/2004 |
| JP | 3510061 | 5/1998 |
| JP | 2001171467 | 12/1999 |

* cited by examiner

*Primary Examiner*—Christopher Ellis
*Assistant Examiner*—Jacob Meyer
(74) *Attorney, Agent, or Firm*—Rankin, Hill & Clark LLP

(57) ABSTRACT

An occupant protection device for a vehicle having several longitudinal rows of seats in a passenger compartment. The occupant protection device includes an inflator for generating gas and a longitudinally elongated roof side airbag mounted to a roof side rail. The roof side airbag includes a plurality of bag portions to inflate in positions corresponding to the rows of seats, respectively. Gas generated from the inflator flows through gas inlets disposed in a substantially middle portion of the roof side airbag into the bag portions generally uniformly, and the roof side airbag inflates along the inside of side glasses of the vehicle.

8 Claims, 20 Drawing Sheets

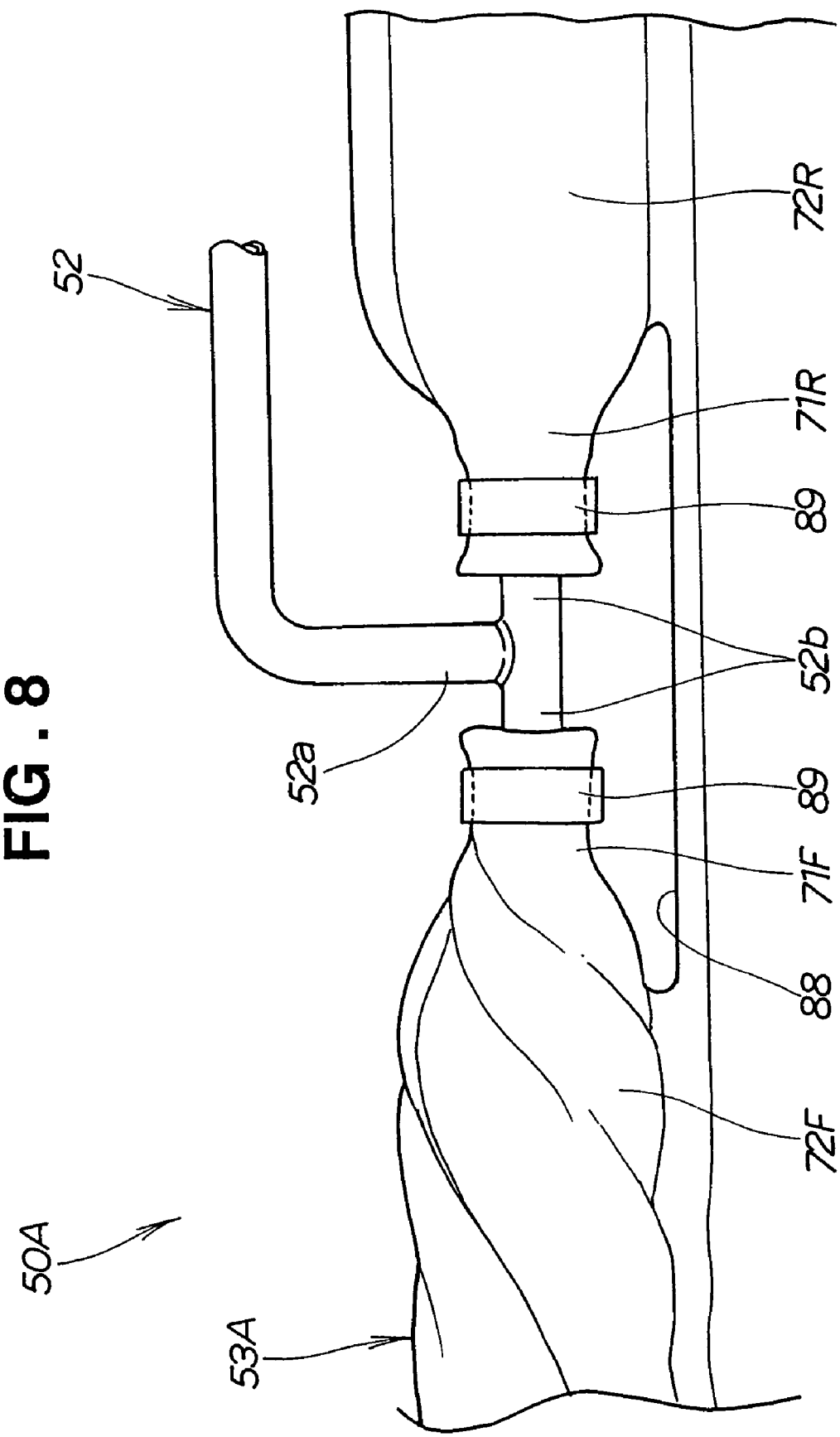

(COMP. EX.)

(EX.)

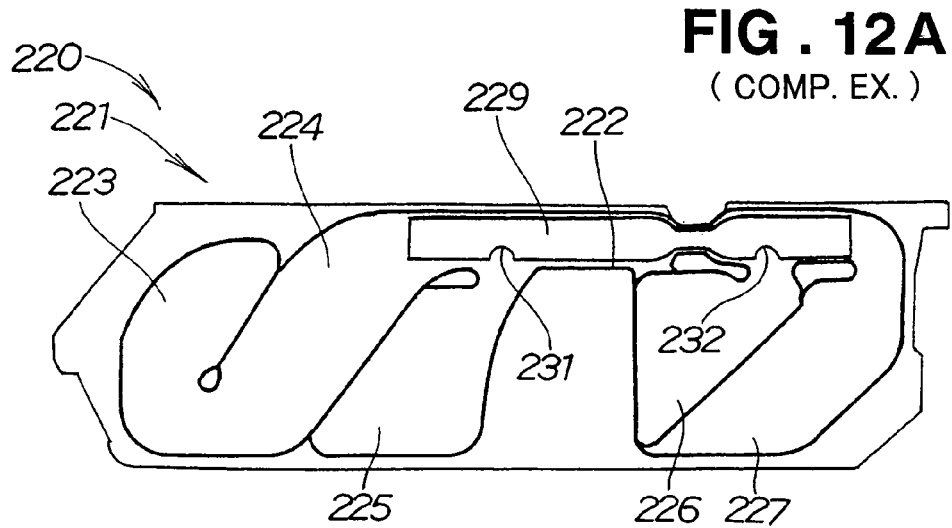
FIG. 12A (COMP. EX.)
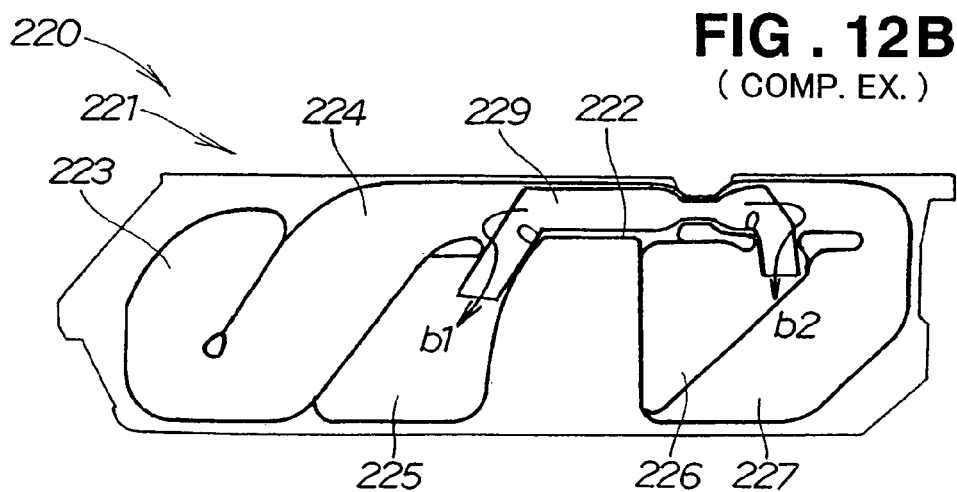
FIG. 12B (COMP. EX.)
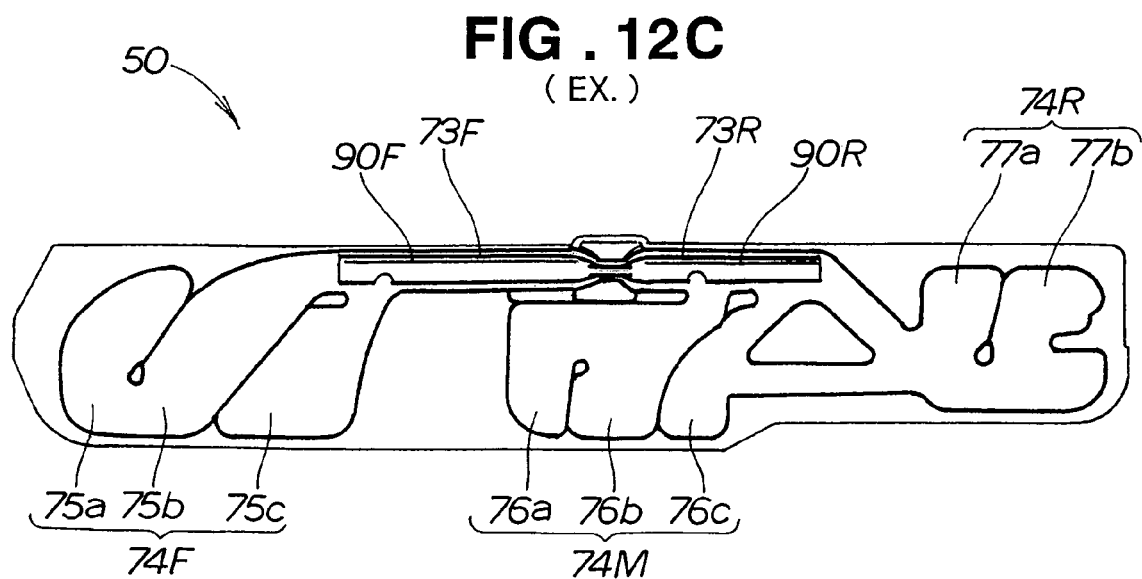
FIG. 12C (EX.)

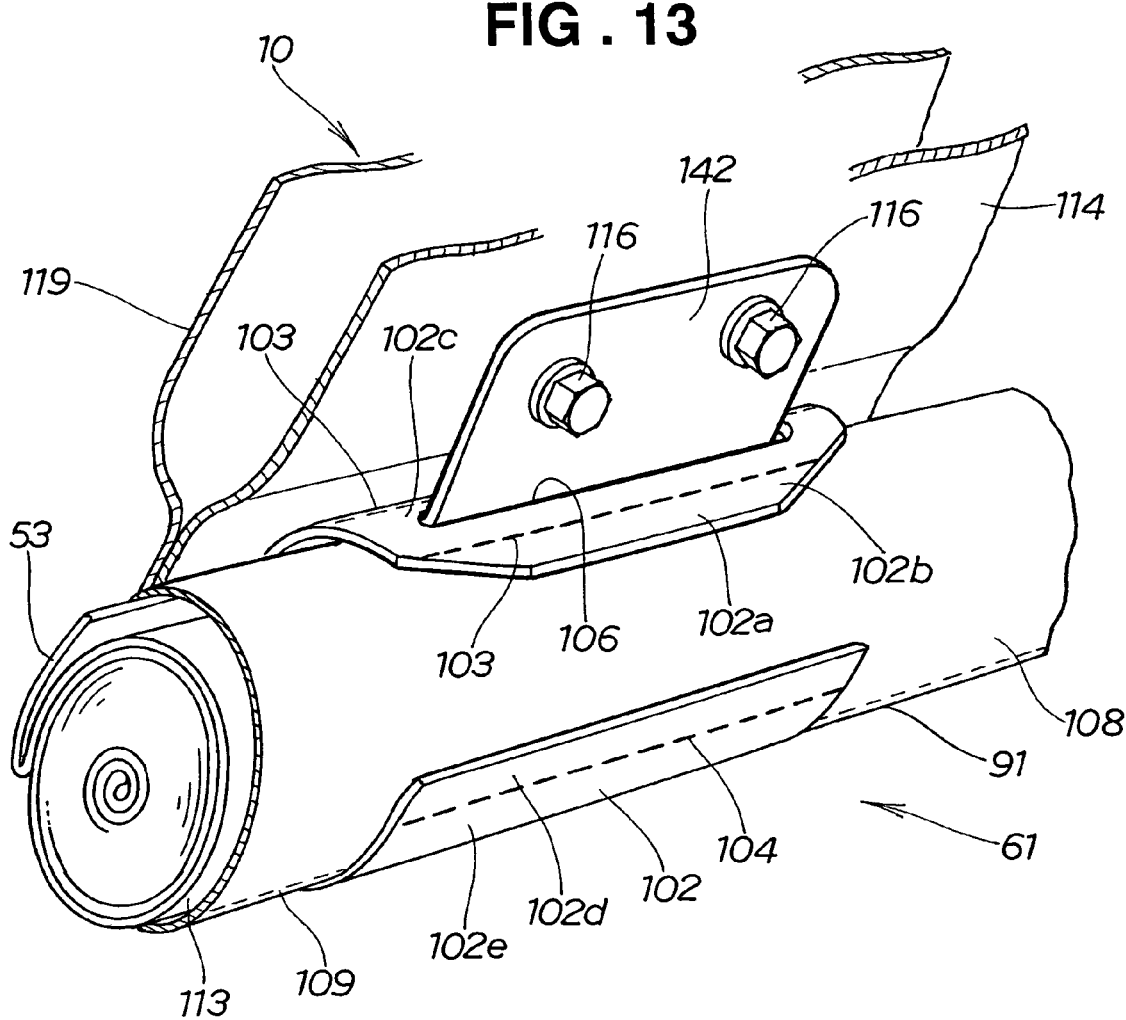

VEHICLE OCCUPANT PROTECTION DEVICE

FIELD OF THE INVENTION

The present invention relates to an improvement in occupant protection devices configured to reinforce protection of occupants when a side of a vehicle is subjected to an impact force.

BACKGROUND OF THE INVENTION

In recent years, there have been developments for improving protection performance especially for the heads of occupants when a vehicle side is subjected to an impact force.

Japanese Patent No. 3510061, for example, proposes an occupant protection device configured to store a roof side airbag from a pillar along a roof side edge so that the roof side airbag is inflated in the form of a curtain along side glasses when subjected to an impact force above a certain level. The roof side airbag is often called a side curtain airbag.

This occupant protection device is configured so that the roof side airbag is stored in a pillar space and a roof space; an inflator is mounted to a roof side rail; the roof side airbag is mounted to the roof side rail by bolts at certain pitches; and the roof side airbag is connected to the inflator via a gas supply pipe. With this occupant protection device, when a sensor detects reception of an impact force above a certain level laterally of the vehicle body, the inflator generates gas to inflate the roof side airbag along the side glasses toward the passenger compartment.

Roof side airbags in the related art are configured with a plurality of inflating portions aligned longitudinally. The front one of the inflating portions inflates, breaking a pillar garish.

Gas supplied from the inflator into a rear upper portion of the roof side airbag rapidly flows into all the inflating portions including the front inflating portion. Gas is thus supplied from the rear upper portion of the roof side airbag, so that the gas pressure to inflate the front inflating portion is relatively small. Therefore, when the front inflating portion inflates, breaking the pillar garnish, the load applied to the pillar garnish can be small.

However, some vehicles are of the type provided with three rows of seats, a front seat, a middle seat and a rear seat. For such vehicles also, it is required to adequately protect all occupants seated in three rows of seats with a roof side airbag. Accordingly, it is necessary to elongate the roof side airbag and to increase the flow of gas for inflating the roof side airbag.

Also, in the related-art roof side airbag, gas flows in from the rear upper portion, so that a gas inflow path to the front inflating portion is long. This results in an increase in pressure loss in the gas inflow path, lowering the gas pressure to inflate the front inflating portion.

With this in view, it is conceived to provide two front and rear gas inlets in a longitudinally substantially middle portion to rapidly, uniformly and sufficiently inflate all the inflating portions including the front inflating portion. However, only providing the gas inlets in the substantially middle portion can increase the gas pressure to inflate the front inflating portion. Given this, it is very difficult to provide a suitable gas pressure. Therefore, when inflating and deploying a roof side airbag, it is necessary to uniformly and sufficiently inflate the entire bag so that an excessive load is not applied from the roof side airbag to a pillar garnish at a front pillar.

Further, the provision of the two front and rear gas inlets in the substantially middle portion of the roof side airbag can separate a portion around the gas inlets into front and rear portions. Consequently, when folding the roof side airbag, the front and rear portions can be twisted relative to each other in the vicinity of the middle portion, which needs to be prevented.

Furthermore, in occupant protection devices in the related art, an inflator and a roof side airbag are mounted separately to a roof side rail, causing variation in the positional relationship of the roof side airbag to the inflator. For example, mounting to the roof side rail an assembly unit in which a roof side airbag is connected to an inflator via a gas supply pipe causes the necessity of mounting the inflator and the roof side airbag separately to the roof side rail because the roof side airbag is a member made from cloth and having flexibility, resulting in variation in the positional relationship of the roof side airbag to the inflator. Consequently, the roof side airbag can be fixed in a twisted condition relative to the inflator. This twist phenomenon is not favorable for adequately supplying gas from the inflator to the roof side airbag. Also, the separate mounting of the inflator and the roof side airbag to the roof side rail causes problems that mounting points are increased; the number of components is increased; and mounting man-hours are increased. That is, it is necessary to mount an inflator and a roof side airbag more properly to a vehicle body, and also to reduce the number of mounting components and mounting man-hours.

Further, as described above, it is necessary for a vehicle with three rows of seats to elongate a roof side airbag longitudinally of the vehicle body. For the uniform flow of gas into the entire airbag, it is necessary to divide the airbag into a plurality of bag portions. In order to inflate and deploy the bag portions in stable condition, it is necessary to provide an inner tube in the roof side airbag to distribute gas to the bag portions through the inner tube.

However, gas generated from an inflator can become a pulsating flow. The pulsating flow of gas can cause a distal end portion of the inner tube to flutter and get into a certain bag portion through an opening formed in the bag portion, preventing inflation and deployment of the roof side airbag. Therefore, it is necessary to prevent fluttering of the inner tube when a pulsating flow is produced in the flow of gas.

Furthermore, it is necessary to allow gas from the inner tube to smoothly flow into certain ones of the divided bag portions.

On the vehicle body, a protrusion can be produced by spot welding or the like. To protect a roof side airbag from such a protrusion, the roof side airbag is covered by a protector cloth, and the protector cloth is attached to the roof side airbag with tape. The operation of attaching the protector cloth to the roof side airbag with tape is performed when the roof side airbag is mounted to the roof side of the vehicle body.

The mounting operation of the roof side airbag is performed using a relatively small space. The use of the small space for attaching the protector cloth to the roof side airbag with tape has a disadvantage that the operation takes time.

For mounting a roof side airbag to a roof side rail, mounting brackets are generally used. It is preferable to increase the strength of the mounting brackets so that when an occupant strikes a mounting bracket, the impact is absorbed by deformation of the mounting bracket.

Such mounting brackets are arranged along the roof side rail at predetermined intervals, so that some mounting bracket is located above a pillar. The pillar is provided with a pillar garnish facing the vehicle interior to also serve to absorb impact. When an occupant strikes the mounting bracket located above the pillar, the occupant also strikes the pillar garnish at the same time. Since the occupant strikes the pillar garnish, the pillar garnish absorbs part of the impact. Consequently, an impact applied to the mounting bracket is made relatively small.

On the other hand, when an occupant strikes a mounting bracket located off the pillar, the occupant only strikes the mounting bracket without striking the pillar garnish, resulting in a relatively great impact applied to the mounting bracket.

The difference in impact applied to the mounting brackets causes the problem that if the mounting brackets have the same strength, it is difficult to well absorb respective impacts applied to the mounting brackets.

Further, in order to mount a roof side airbag to a vehicle with three rows of seats, the roof side airbag is relatively elongated as described above. This increases intervals between mounting brackets for mounting the roof side airbag to the vehicle body, making it difficult to fit the roof side airbag along the vehicle body, and leaving room for improvement.

Furthermore, since the relatively elongate roof side airbag is likely to be twisted, when the roof side airbag is mounted to the roof side rail, it is necessary to hold the roof side airbag to prevent twisting. However, it is a difficult operation to mount the elongate roof side airbag to the vehicle body while holding it, resulting in low workability. Thus, the mounting operation of the roof side airbag is time-consuming and leaves room for improvement.

SUMMARY OF THE INVENTION

The present invention provides an occupant protection device for a vehicle provided with a longitudinally front seat, middle seat and rear seat in a passenger compartment. The occupant protection device comprises an inflator for generating gas; and a roof side airbag placed in a certain pillar space which is provided by a pillar garnish mounted to a passenger compartment side of a front pillar provided at a front part of a vehicle body, and in a longitudinally elongated certain roof space provided at a side corner of a roof on the passenger compartment side, to be inflated by the gas along side glasses toward the passenger compartment; wherein the roof side airbag comprises gas inlets disposed in a longitudinally substantially middle portion to receive gas supply from the inflator; gas main passages extending longitudinally from the gas inlets along the roof space; a front bag portion to be inflated in a position corresponding to the front seat; a middle bag portion to be inflated in a position corresponding to the middle seat; and a rear bag portion to be inflated in a position corresponding to the rear seat; and the gas main passages communicate with the bag portions; and the front bag portion includes an inflating portion in which, during inflation toward the passenger compartment along the side glasses, gas flowing in from the communicating gas main passage heads downward and then flows forward and upward.

Gas generated from the inflator flows through the gas inlets disposed in the longitudinally substantially middle portion into the gas main passages, and flows from the gas main passages to the front, middle and rear bag portions generally uniformly. As a result, the folded bag portions inflate, deploying along the side glasses toward the passenger compartment. All occupants seated in the front, middle and rear seats are properly and adequately protected.

Gas flowing from the gas main passage to the front bag portion goes downward and then flows forward and upward. Specifically, when gas starts to flow into the front bag portion, the folded front bag portion is unrolled downward by the gas flowing downward while only a rear portion of the front bag portion inflates and deploys. For example, a portion of the front bag portion folded in the pillar space starts to deploy into the passenger compartment, breaking the pillar garnish. At this moment, the gas pressure in a front portion of the front bag portion among inflating portions is very small. Therefore, when the front bag portion starts to deploy into the passenger compartment, an excessive load is not applied to the pillar garnish from the front bag portion. Thereafter, when the gas starts to flow forward and upward in the front bag portion, a forward upper portion of the front bag portion among the inflating portions starts to inflate by the gas pressure. Since the forward upper portion of the front bag portion inflates after the front bag portion deploys from the pillar space into the passenger compartment as described above, an excessive load is not applied to the pillar garnish.

Since the gas inlets are disposed in the longitudinally substantially middle portion, a gas inflow path from the gas inlet to the front bag portion can be shortened, resulting in a reduction in pressure loss in the gas inflow path. As a result, a gas pressure sufficient to inflate and deploy the front bag portion into the passenger compartment is provided.

The roof side airbag preferably further comprises inner tubes placed in the gas main passages for distributing the gas to the bag portions. The inner tubes each include a position stabilizing member for maintaining a predetermined shape thereof, thereby to prevent, when the gas becomes a pulsating flow, fluttering of the inner tube by the pulsating flow of the gas. Consequently, when gas generated from the inflator becomes pulsating flows, the inner tubes are maintained in their shapes, ensuring gas supply to certain bag portions. As a result, stability in inflation and deployment of the roof side airbag is provided.

In the occupant protection device of the present invention, preferably, at least one of the inflator and a supply pipe for supplying gas from the inflator to the roof side airbag, and the roof side airbag are mounted to the vehicle body by being fastened together with a bolt. By this fastening together, the roof side airbag is mounted to the vehicle body, being more properly positioned relative to the inflator. Consequently, the roof side airbag is prevented from being fixed in a twisted condition relative to the inflator; gas from the inflator is supplied adequately to the roof side airbag; and the roof side airbag can be more properly and stably inflated and deployed. Further, the fastening together allows a reduction in the number of mounting points to the vehicle body and reductions in the number of mounting parts and mounting man-hours.

The occupant protection device preferably further comprises a cover for covering the roof side airbag in a folded condition; and a protector cloth sewn to the cover with a plurality of sewing threads for protecting the roof side airbag; wherein, the protector cloth is disposed at a location corresponding to a protrusion on the vehicle body; and of the sewing threads, the sewing thread at an area from which the folded roof side airbag inflates and deploys is weakened to be able to be torn by an inflating and deploying force of the roof side airbag. By covering the folded airbag with the cover as described above, the protector cloth can be attached to the roof side airbag. This can eliminate the operation of attaching the protector cloth to the airbag with tape, which has been necessary in the related art during the airbag mounting operation, and allows the mounting operation to be performed without taking much time.

For inflating and deploying the roof side airbag, it is necessary to ensure that a certain sewing thread with which the protector cloth is sewn to the cover is torn. For this, of the sewing threads, the sewing thread in the area from which the roof side airbag is inflated and deployed is weakened to be torn by the inflating and deploying force of the roof side airbag. This ensures that the weak sewing thread is torn when the airbag is inflated and deployed.

The roof side airbag preferably further comprises inner tubes placed in the gas main passages for distributing the gas to the bag portions. The inner tubes include discharge holes for distributing the gas to the bag portions. The discharge holes are disposed at positions corresponding to openings formed in the bag portions, and located upstream of flows of the gas from centers of the openings. Consequently, gas discharged from the discharge holes toward the openings flows toward distal end portions of the certain bag portions, and thus the gas flow is not disturbed. This allows gas to be supplied to the bag portions in a balanced manner, and the roof side airbag smoothly inflates and deploys. Also, an unnecessary stress is not applied to the roof side airbag.

The roof side airbag in the present invention preferably comprises the two front and rear gas inlets disposed in the longitudinally substantially middle portion, and a bridge connecting portions near the two gas inlets to each other. When the roof side airbag is folded, the bridge prevents portions including the two front and rear gas inlets from twisting to each other. Consequently, the folded roof side airbag is properly placed in the longitudinally elongated space formed at the side corner of the roof on the passenger compartment side, and is properly inflated and deployed by the gas from the inflator.

The occupant protection device preferably further comprises a plurality of mounting brackets for mounting the roof side airbag to the roof of the vehicle body; wherein, of the mounting brackets, the mounting bracket located above a pillar constituting a part of a window frame of the vehicle is reduced in strength, and the reduced-strength mounting bracket is combined with a pillar garnish provided at the pillar so that the impact absorbing capability of the reduced-strength mounting bracket and the pillar garnish is similar to that of the mounting bracket located off the pillar.

The pillar is provided with the pillar garnish. When an occupant strikes the mounting bracket above the pillar, the occupant also strikes the pillar garnish at the same time. Since the occupant strikes the pillar garnish, part of the impact is absorbed by the pillar garnish. Consequently, when the occupant strikes the mounting bracket above the pillar, the impact applied to the mounting bracket is made small. Therefore, the mounting bracket located above the pillar is reduced in strength. With this, when a small impact is applied to the mounting bracket, the small impact can be held by the mounting bracket.

On the other hand, when an occupant strikes the mounting bracket located off the pillar, the occupant only strikes the mounting bracket without striking the pillar garnish. Consequently, the impact applied to the mounting bracket is relatively great. Therefore, the strength of the mounting bracket located off the pillar is increased. With this, when a relatively great impact is applied to the mounting bracket, the great impact can be held by the mounting bracket.

In this manner, impacts applied to the mounting brackets can be absorbed uniformly as a whole.

The occupant protection device preferably further comprises a cover for covering the roof side airbag in a folded condition; and a clip including a head disposed within the cover and an engaging portion protruding outward from inside the cover; wherein the engaging portion is engaged with the vehicle body. Thus fitting the engaging portion to a mounting hole formed in the vehicle body facilitates mounting of the cover and the roof side airbag to the vehicle body. Consequently, the cover and the roof side airbag can be disposed without being dislocated from the vehicle body. The use of the clip simplifies the roof side airbag mounting structure.

When the roof side airbag is inflated and deployed, the cover is torn and disengaged from the head of the clip, so that the clip does not fly into the passenger compartment.

The clip preferably includes a holding portion provided at a proximal portion of the engaging portion and outside of the cover; and the holding portion is pressed from outside the cover toward the vehicle body to engage the engaging portion with the vehicle body. Therefore, when mounting the clip to the vehicle body, it is not necessary to apply an extra force to the cover, and the cover does not drop off the clip.

BRIEF DESCRIPTION OF THE DRAWINGS

Certain preferred embodiments of the present invention will be described in detail below, by way of example only, with reference to the accompanying drawings, in which:

FIG. 8 is a partial view around gas inlets of a roof side airbag according to a comparative example;

FIGS. 12A and 12B are schematic diagrams showing movement of an inner tube provided in a roof side airbag in a comparative example; and FIG. 12C is a schematic diagram of the roof side airbag showing the state of the inner tubes in the present invention;

FIG. 13 is a perspective view of a protector cloth mounting structure in the occupant protection device according to the present invention;

DETAILED DESCRIPTION OF THE PREFERRED EMBODIMENT

Figure 1:
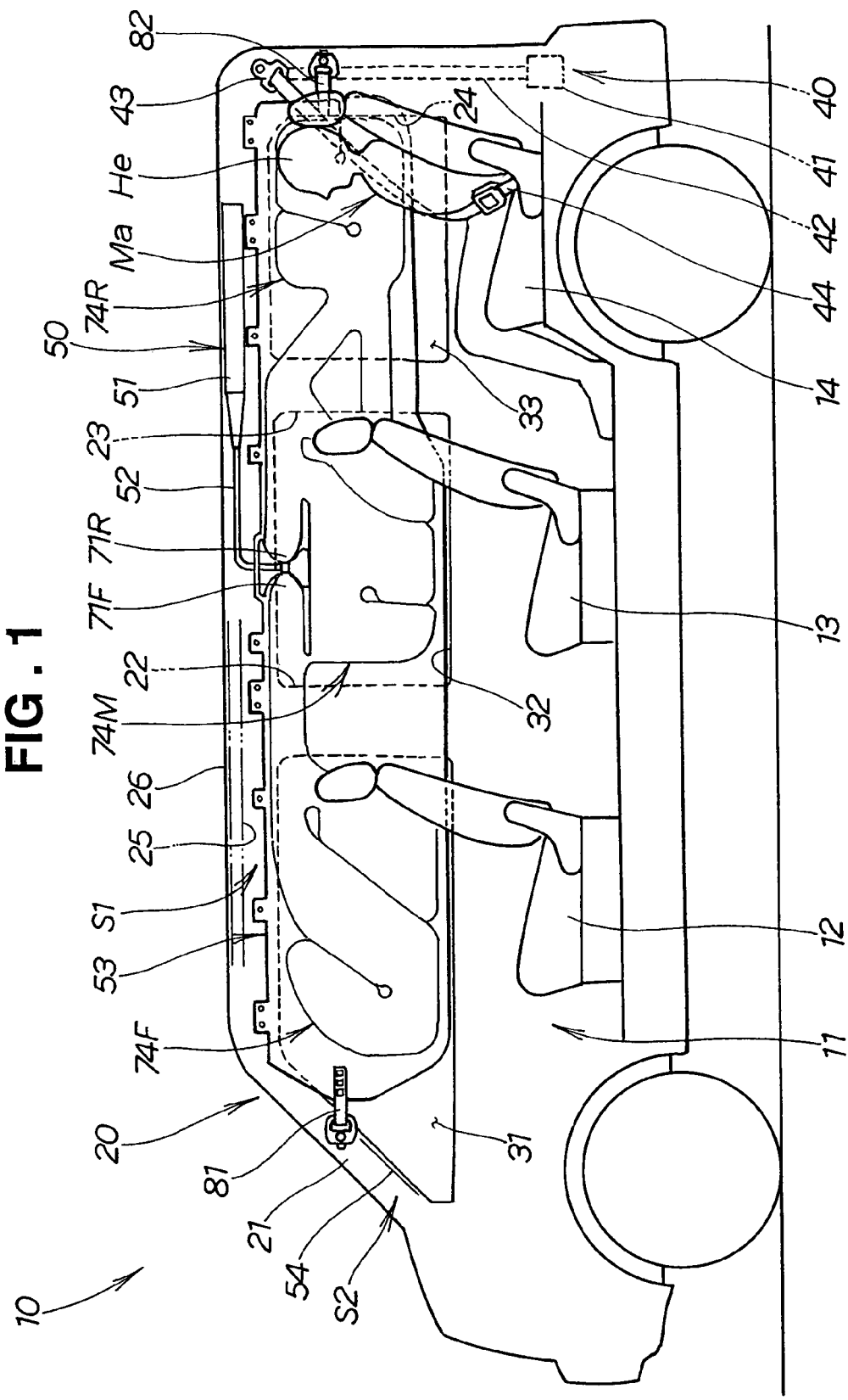
FIG. 1 is a schematic diagram of a vehicle provided with an occupant protection device according to the present invention.

Initial reference is made to FIG. 1 showing a vehicle 10 provided with an occupant protection device 50. Actually, the occupant protection device 50 is provided on each side of a passenger compartment 11. The right and left occupant protection devices 50 have the same construction. Therefore, in this embodiment, only the occupant protection device 50 disposed on the right side of the vehicle 10 is illustrated for description, and description of the left-side occupant protection device 50 will be omitted.

The vehicle 10 shown in FIG. 1 is a station wagon with three rows of seats including a front seat 12, a middle seat 13 and a rear seat 14 in the passenger compartment 11. A vehicle body 20 includes a front pillar 21, a rear pillar 24, and a forward middle pillar 22 and a rearward middle pillar 23 provided therebetween. A roof side rail 25 is provided across the upper ends of the pillars 21, 22, 23 and 24. A roof 26 is supported by the roof side rail 25. A front side glass 31, a middle side glass 32 and a rear side glass 33 are provided between the pillars 21, 22, 23 and 24.

An occupant Ma seated in the rightmost area of the rear seat 14 is restrained by a seatbelt device 40. The seatbelt device 40 includes a seatbelt 42 wound in a retractor 41 to be pulled out and put through a through ring 43 and then hooked to a lower anchor 44. The retractor 41 is a belt winder mounted to a lower portion of the rear pillar 24. The through ring 43 is a member mounted to an upper portion of the rear pillar 24. The lower anchor 44 is attached to a side portion of the cushion of the rear seat 14. The seat belt 42 restrains the upper body and the waist of the occupant Ma.

The occupant protection device 50 detects reception of an impact force exceeding a certain level at the side of the vehicle 10 with an impact detection sensor (not shown). According to the sensor signal, an inflator 51 generates gas. The gas is supplied through a supply pipe 52 into a roof side airbag 53, so that the roof side airbag 53 inflates along the side glasses 31, 32 and 33 toward the passenger compartment 11.

The roof side airbag 53 inflated and deployed into the passenger compartment 11 covers the side glasses 31 to 33, protecting especially the heads He of occupants Ma seated in the seats 12, 13 and 14.

Figure 2:
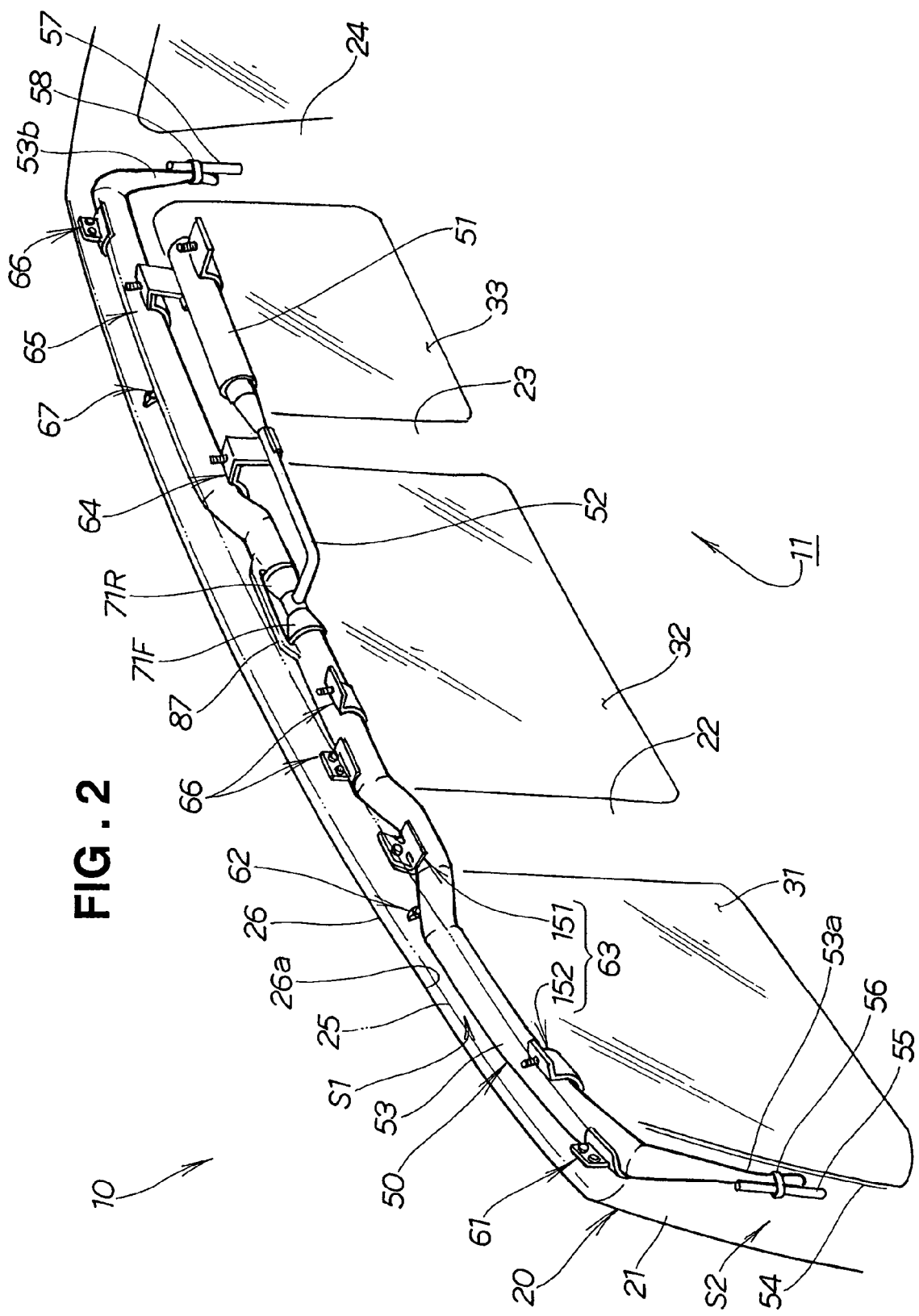
FIG. 2 is a perspective view of the occupant protection device mounted to a roof side rail.

As shown in FIGS. 1 and 2, the supply pipe 52 is a gas pipe to supply gas from the inflator 51 to the roof side airbag 53. The inflator 51 and the supply pipe 52 are extended longitudinally and arranged in parallel with the roof side airbag 53.

The vehicle body 20 includes a longitudinally elongated certain roof space S1 (space S1) at a side corner 26a of the roof 26 on the passenger compartment 11 side. The inflator 51, the supply pipe 52 and the roof side airbag 53 are placed in the roof space S1.

A pillar garnish 54 is mounted to the passenger compartment 11 side of the front pillar 21 provided at the front of the vehicle body 20, to provide a certain pillar space S2. A front portion of the roof side airbag 53 is placed in the pillar space S2.

A front end portion 53a of the roof side airbag 53 is secured to the front pillar 21 by a fastening member 56 such as a band via a bracket 55. A rear end portion 53b of the roof side airbag 53 is secured to the rear pillar 24 by a fastening member 58 such as a band via a bracket 57. The occupant protection device 50 is mounted to the roof side rail 25 by a protector cloth mounting structure 61, an airbag fastening structure 62, a mounting bracket structure 63, and various types of fixing mechanisms 64, 65, 66, 66, 67.

The mounting bracket structure 63 includes a first mounting bracket 151 and a second mounting bracket 152.

The protector cloth mounting structure 61, the airbag fastening structure 62 and the mounting bracket structure 63 will be described with reference to FIGS. 13 to 21.

Figure 3:
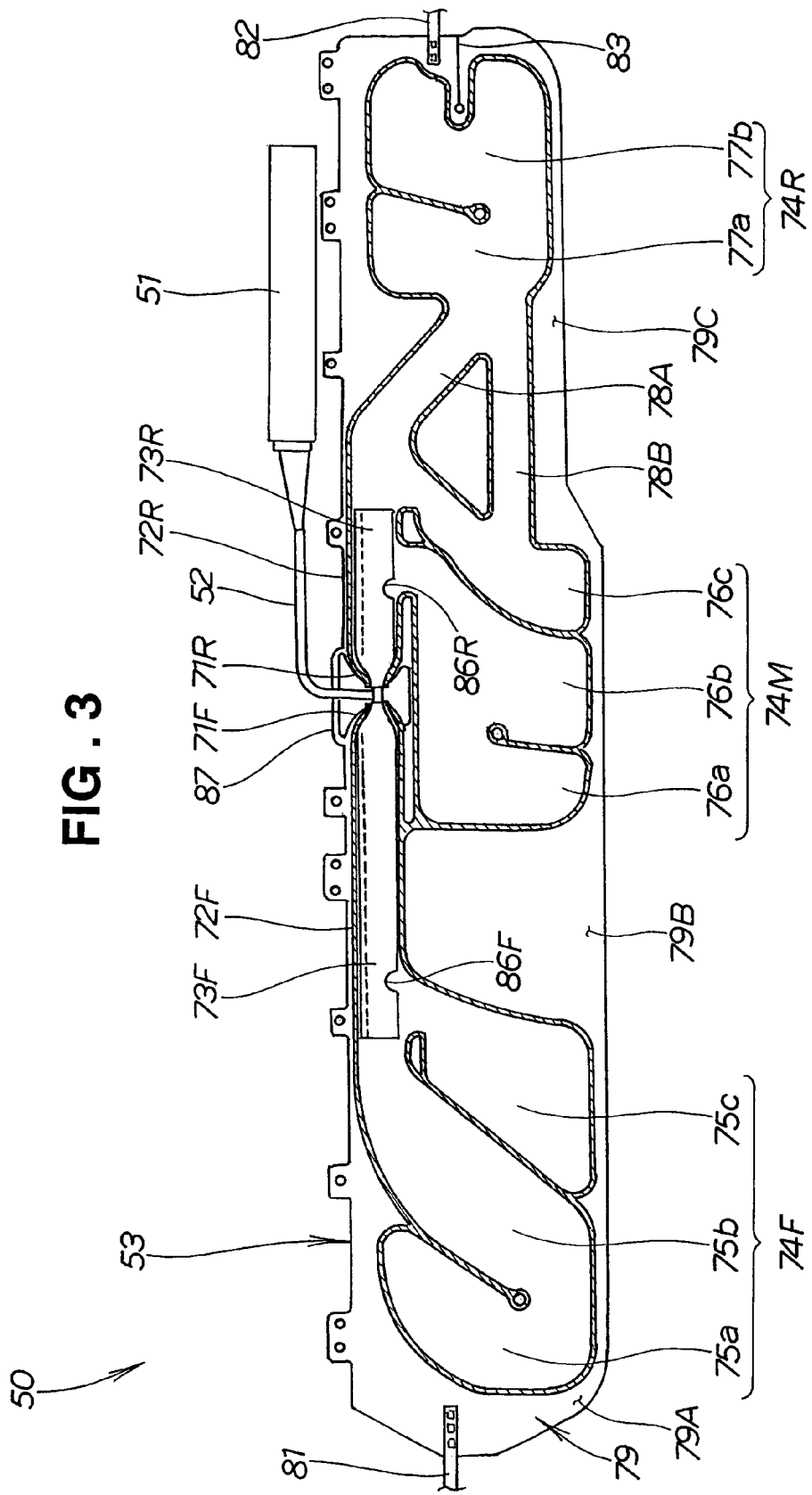
FIG. 3 is a diagram of the occupant protection device with a roof side airbag deployed shown in cross section.

As shown in FIGS. 1 and 3, the roof side airbag 53 is made from a flexible sheet such as an airtight cloth.

The roof side airbag 53 is integrally provided with two front and rear gas inlets 71F, 71R, two front and rear gas main passages 72F, 72R, two front and rear inner tubes 73F, 73R, and a front bag portion 74F, a middle bag portion 74M and a rear bag portion 74R.

The two front and rear gas inlets 71F, 71R are disposed in a longitudinally substantially middle portion.

The two front and rear gas main passages 72F, 72R are extended longitudinally from the gas inlets 71F, 71R along the roof space S1.

The two front and rear inner tubes 73F, 73R are individually passed through the gas main passages 72F, 72R, respectively, and individually communicate with the two front and rear gas inlets 71F, 71R at one end thereof, respectively.

The front bag portion 74F communicates with the front inner tube 73F through the front gas main passage 72F, and inflates in a position corresponding to the front seat 12.

The middle bag portion 74M communicates with the rear inner tube 73R through the rear gas main passage 72R, and inflates in a position corresponding to the middle seat 13.

The rear bag portion 74R communicates with the rear inner tube 73R through the rear gas main passage 72R, and inflates in a position corresponding to the rear seat 14.

The front bag portion 74F includes three longitudinally adjacent inflating portions 75a, 75b and 75c so that when the front bag portion 74F inflates along the front side glass 31 toward the passenger compartment 11, gas flowing from the front gas main passage 72F into the front bag portion 74F heads downward and then flows forward and upward in a turning direction.

These inflating portions 75a, 75b and 75c constitute a front inflating portion 75a, a middle inflating portion 75b and a rear inflating portion 75c, arranged in line. The front inflating portion 75a and the middle inflating portion 75b communicate with each other, and the middle inflating portion 75b and the rear inflating portion 75c communicate with each other.

In the front bag portion 74F, the middle inflating portion 75b has an opening at an upper end disposed near the front end of the front gas main passage 72F for communication therewith, and a front lower end communicating with an opening at a rear lower end of the front inflating portion 75a. The front inflating portion 75a has an opening only at the rear lower end. The rear inflating portion 75c has an opening at an upper end disposed near the front end of the front gas main passage 72F for communication therewith.

The middle bag portion 74M includes three longitudinally adjacent inflating portions 76a, 76b and 76c aligned below the two front and rear gas inlets 71F, 71R. These inflating potions 76a, 76b and 76c constitute a front inflating portion 76a, a middle inflating portion 76b, and a rear inflating portion 76c, arranged in line. The front inflating portion 76a and the middle inflating portion 76b communicate with each other, and the middle inflating portion 76b and the rear inflating portion 76c communicate with each other.

The middle inflating portion 76b has an opening at a rear upper end disposed near the rear end of the rear gas main passage 72R for communication therewith, and a front upper end communicating with an opening at a rear upper end of the front inflating portion 76a. The front inflating portion 76a has an opening only at the rear upper end. The rear inflating portion 76c has an opening at an upper end disposed near the rear end of the rear gas main passage 72R for communication therewith.

The rear bag portion 74R includes two front and rear inflating portions 77a, 77b aligned rearward of the rear gas main passage 72R. These inflating portions 77a, 77b constitute a front inflating portion 77a and a rear inflating portion 77b, arranged in line.

The front inflating portion 77a has an opening at a front lower end communicating with the rear end of the rear gas main passage 72R through an upper communicating tube 78A and also communicating with a rear opening of the rear inflating portion 76c of the middle bag portion 74M through a lower communicating tube 78B.

The rear inflating portion 77b has an opening at a front lower end communicating with an opening at a rear lower end of the front inflating portion 77a.

The roof side airbag 53 is integrally provided with a non-inflating portion 79 around the bag portions 74F, 74M and 74R. The non-inflating portion 79 includes a front non-inflating portion 79A, a middle non-inflating portion 79B, and a rear non-inflating portion 79C.

The front non-inflating portion 79A is provided with a front strap 81 in the form of a string or band. The rear non-inflating portion 79C is provided with a rear strap 82 in the form of a string or band, and a slit 83.

In FIG. 3, reference numerals 86F, 86R denote discharge holes formed in the two front and rear inner tubes 73F, 73R, respectively.

As shown in FIG. 2, the vehicle body 20 has the roof space S1 at the side corner 26a of the roof 26 on the passenger compartment 11 side, and the inflator 51, the supply pipe 52 and the roof side airbag 53 in a folded condition are placed in the roof space S1.

Figure 5:
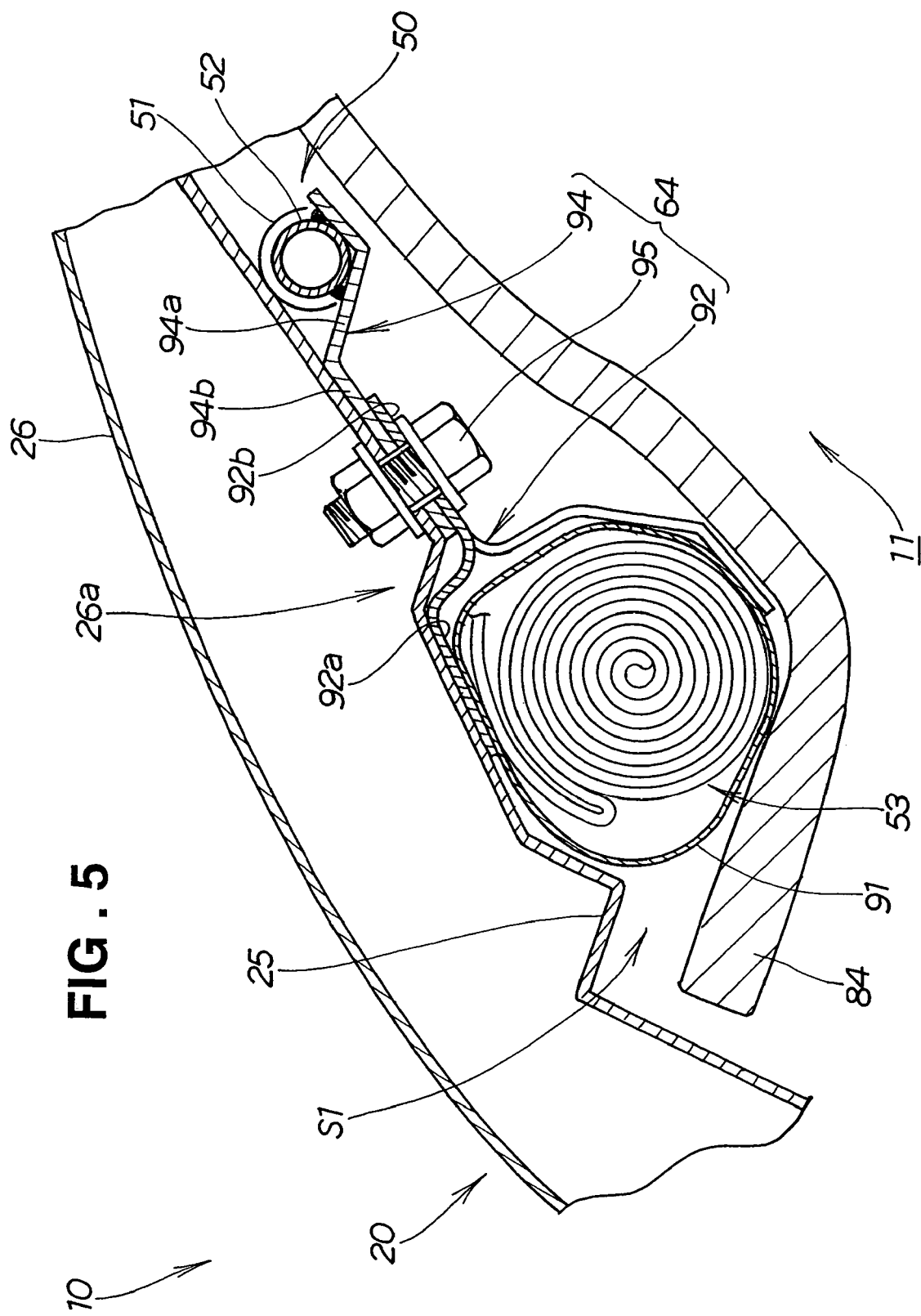
FIG. 5 is a cross-sectional view taken along line 5-5 of FIG. 4.

As shown in FIG. 5, the roof space S1 is a space formed between the side corner 26a of the roof 26 and a roof lining 84 as the lining of the roof 26.

Figure 4:
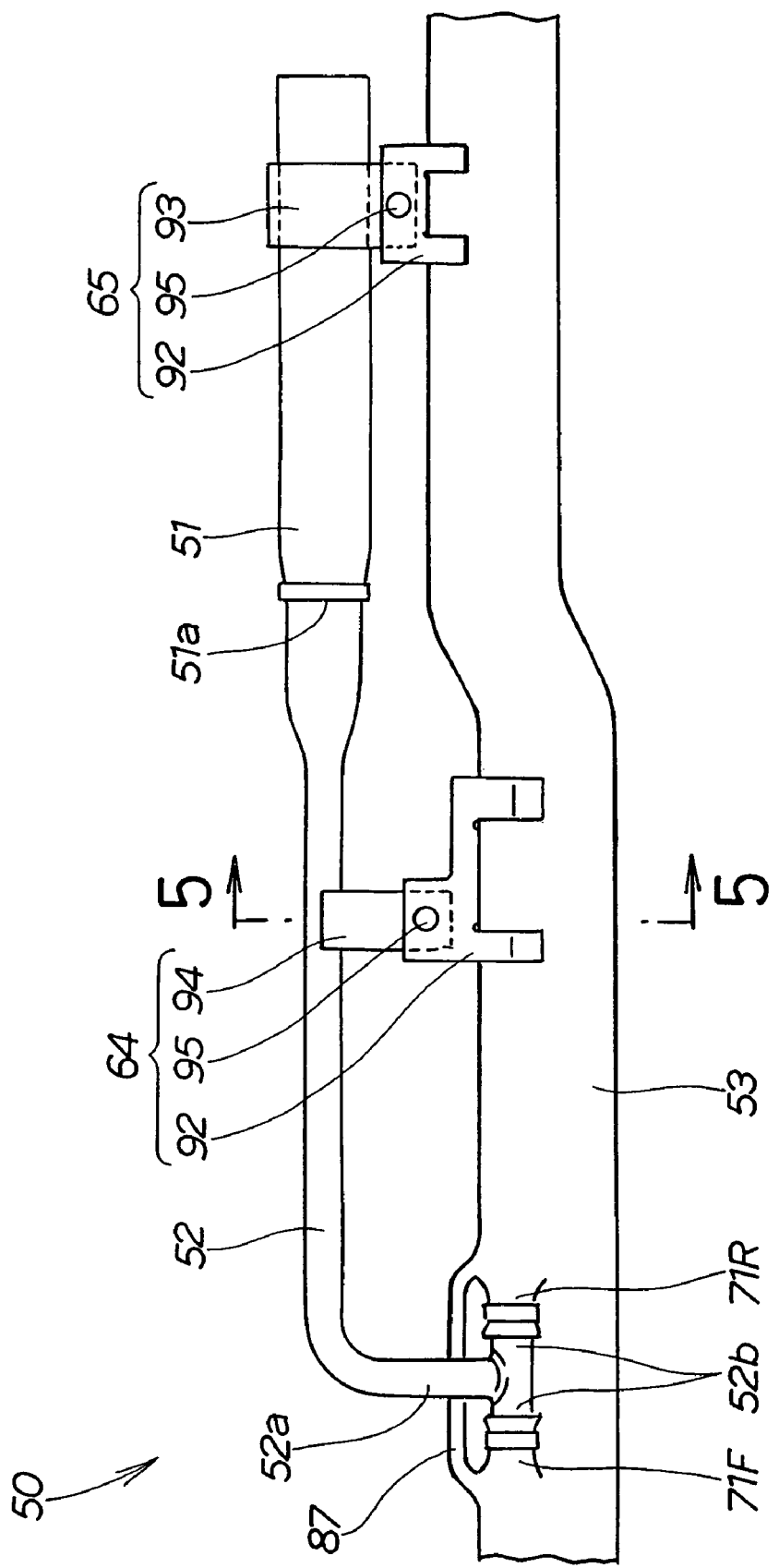
FIG. 4 is an enlarged partial view of the occupant protection device.

As shown in FIG. 4, the longitudinally elongated inflator 51 is connected to the supply pipe 52 extending forward from a gas outlet 51a at the front distal end. The inflator 51 and the supply pipe 52 are arranged along the folded roof side airbag 53. The front end of the supply pipe 52 is connected to the gas inlets 71F, 71R of the roof side airbag 53.

As shown in FIG. 5, the roof side airbag 53 in a spirally rolled (folded) condition is housed in a tubular cloth bag cover 91. The bag cover 91 has a cut line such as a perforation to be easily opened by an inflating force of the roof side airbag 53.

The roof side airbag 53 in the folded condition is mounted to the roof side rail 25 by a bag bracket 92.

As shown in FIGS. 4 and 5, the inflator 41 is mounted to the roof side rail 25 by an inflator bracket 93. The supply pipe 52 is mounted to the roof side rail 25 by a supply pipe bracket 94.

The bag bracket 92 shown in FIGS. 4 and 5 is a sheet steel product formed by bending, and includes a forked body 92a retaining the roof side airbag 53 enclosed in the bag cover 91 in a clasping fashion, and a plate mounting portion 92b extending upward from the body 92a along the roof side rail 25.

The supply pipe bracket 94 is a sheet steel product formed by bending, and includes a body 94a fixed to the supply pipe 52 by welding or the like, and a plate mounting portion 94b extending from the body 94a to the bag bracket 92.

These mounting portions 92b and 94b are placed on the roof side rail 25. The mounting portions 92b and 94b are fixed to the roof side rail 25 by a single bolt 95, whereby the brackets 92 and 94 are mounted to the vehicle body 20 by the bolt 95 fastening them together. Accordingly, the supply pipe 52 and the roof side airbag 53 can be mounted to the vehicle body 20 by the bolt 95 fastening them together.

The combinational structure of the bag bracket 92, the supply pipe bracket 94 and the bolt 95 constitutes a fixation mechanism 64 to the vehicle body 20.

The inflator bracket 93 shown in FIG. 4 is similar in structure to the supply pipe bracket 94. Brackets 92 and 93 can be mounted to the vehicle body 20 by a bolt 95 fastening them together. Accordingly, the inflator 51 and the roof side airbag 53 can be mounted to the vehicle body 20 by the bolt 95 fastening them together.

The combinational structure of the bag bracket 92, the inflator bracket 93 and the bolt 95 constitutes a fixation mechanism 65 to the vehicle body 20.

As is clear from the above description, the occupant protection device 50 is configured so that the supply pipe 52 to supply gas from the inflator 51 to the roof side airbag 53 is extended longitudinally and disposed in parallel with the roof side airbag 53; the inflator 51 and the roof side airbag 53 are placed in the roof space S1 together; and at least one of the inflator 51 and the supply pipe 52, and the roof side airbag 53 are mounted to the vehicle body 20 by the bolt 95 fastening them together.

The roof side airbag 53 can be mounted to the vehicle body 20, being more properly positioned relative to the inflator 51, so that the roof side airbag 53 is prevented from being fixed in a twisted condition relative to the inflator 51. Consequently, gas from the inflator 51 can be supplied adequately to the roof side airbag 53 so as to more properly and stably inflate and deploy the roof side airbag 53.

Also, since at least one of the inflator 51 and the supply pipe 52, and the roof side airbag 53 are mounted to the vehicle body 20 by the bolt 95 fastening them together, mounting points to the vehicle body 20 can be reduced accordingly. This allows a reduction in the number of mounting parts for the inflator 51 and the roof side airbag 53 relative to the vehicle body 20 and a reduction in mounting man-hours, facilitating mounting.

Figure 6:
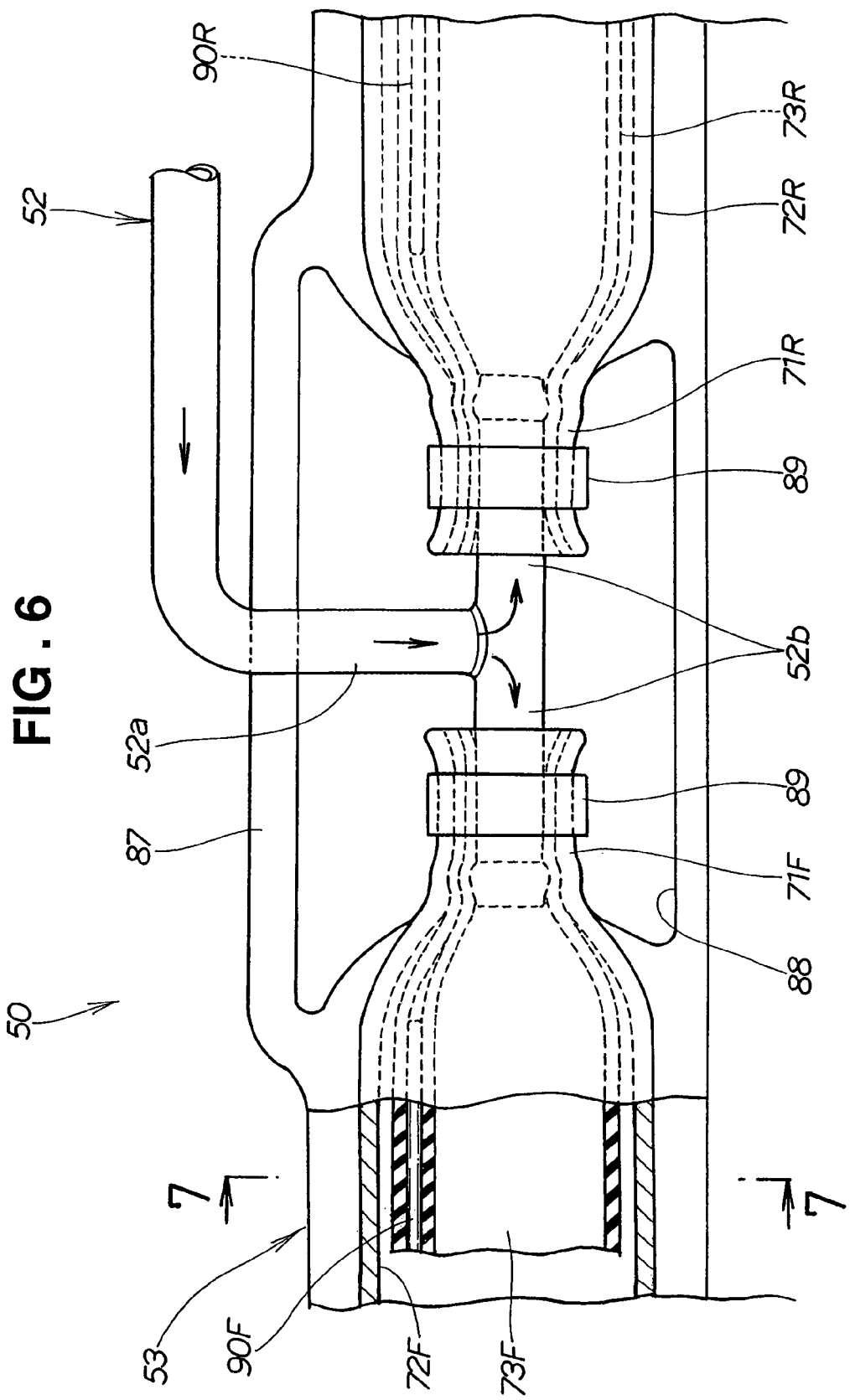
FIG. 6 is an enlarged partially cross-sectional view of a portion around gas inlets of the roof side airbag.

FIG. 6 shows a portion around the gas inlets 71F, 71R of the roof side airbag shown in FIG. 4.

Figure 7:
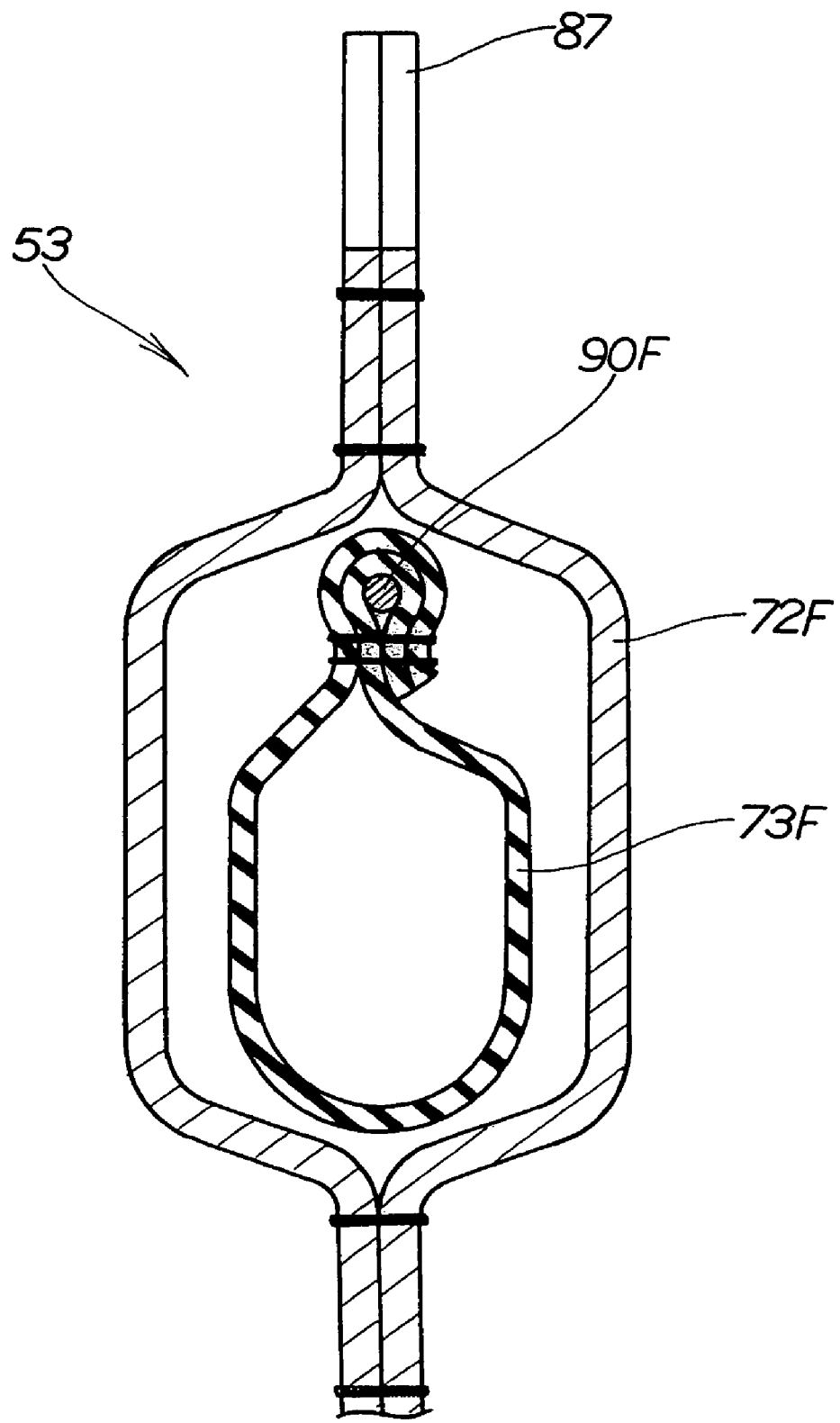
FIG. 7 is a cross-sectional view taken along line 7-7 of FIG. 6.

As shown in FIGS. 6 and 7, the roof side airbag 53 includes the two front and rear gas inlets 71F, 71R disposed in a longitudinally substantially middle portion of the bag 53, and a bridge 87 connecting portions near the two gas inlets 71F, 71R to each other.

The two front and rear gas inlets 71F, 71R are opposite to each other. As described above, the supply pipe 52 is disposed in parallel with the roof side airbag 53 and extended forward to the middle of the bag 53. The supply pipe 52 has a downward extending portion 52a at a front end portion thereof bent and oriented toward the gas inlets 71F, 71R. A distal end portion of the downward extending portion 52a forks into two front and rear connecting pipe portions 52b, 52b. That is, a gas supplying end portion of the supply pipe 52 is formed substantially in a T shape with the downward extending portion 52a and the two connecting pipe portions 52b, 52b.

As shown in FIG. 6, at mid-part of the bag 53, the front and rear gas main passages 72F, 72R have ends longitudinally spaced a predetermined distance from each other to provide a notched or recessed portion 88 therebetween. An open end of the recessed portion is bridged as by 87 (non-inflating portion).

As shown in FIGS. 6 and 7, the front and rear gas inlets 71F, 71R are shaped by forming middle end portions of the gas main passages 72F, 72R in an elongate tube. End portions of the inner tubes 73F, 73R are engaged in those tubes with airtightness. Consequently, the gas inlets 71F, 71R constitute double pipes of the elongate tubes of the gas main passages 72F, 72R and the end portions of the inner tubes 73F, 73R, and are aligned longitudinally concentrically.

The longitudinally extending two connecting pipe portions 52b, 52b are inserted into the gas inlets 71F, 71R and fixed by bands 89, 89 for interconnection.

The inner tubes 73F, 73R are straight tubes formed by rolling up and sewing a flexible sheet made from airtight cloth or the like in a tubular shape. Core bars made from steel rods 90F, 90R are provided in the edges of the straight tubes.

The recessed portion 88 is in the form of a notch and thus opens at one end. The bridge 87 connects open ends of the recessed portion 88 to each other. Specifically, the bridge 87 connects proximal portions of the gas inlets 71F, 71R or portions near them of the gas main passages 72F, 72R to each other. The bridge 87 can be formed by a band of a certain width of an extended edge portion of the sheet constituting the gas main passages 72F, 72R.

Next, the bridge 87 shown in FIGS. 6 and 7 will be described in comparison with a comparative example shown in FIG. 8. An occupant protection device 50A in the comparative example shown in FIG. 8 is configured so that portions near two gas inlets 71F, 71R of a roof side airbag 53A are not connected by a bridge 87 to each other (see FIG. 6).

The roof side airbag 53A in the comparative example has the two front and rear gas inlets 71F, 71R provided in a substantially middle portion, so that a portion around the gas inlets 71F, 71R are divided into front and rear portions. Therefore, when the roof side airbag 53A is folded, the front and rear portions can be twisted relative to each other in the vicinity of the middle portion (especially at gas main passages 72F, 72R).

Compared to this, as shown in FIGS. 6 and 7, the occupant protection device 50 in this embodiment is configured so that portions near the two gas inlets 71F, 71R are connected by the bridge 87 to each other. Therefore, when the roof side airbag 53 is folded, the bridge 87 prevents the front and rear portions from twisting relative to each other in the vicinity of the middle portion of the airbag 53. This allows the roof side airbag 53 to be folded properly and placed in the roof space S1 (see FIG. 1). Consequently, the roof side airbag 53 is properly inflated and deployed by gas generated by the inflator 51.

Figure 9A:
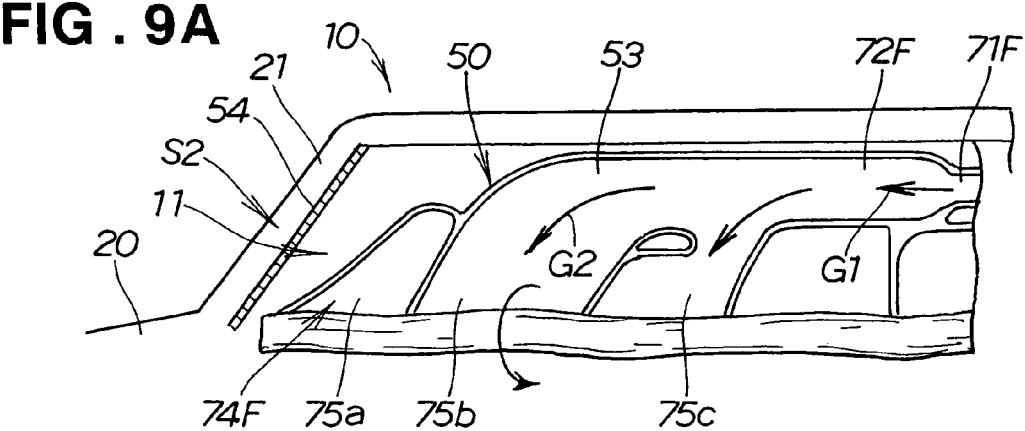
FIGS. 9A and 9B are diagrams showing an inflating and deploying condition of the roof side airbag according to the present invention.
Figure 9B:
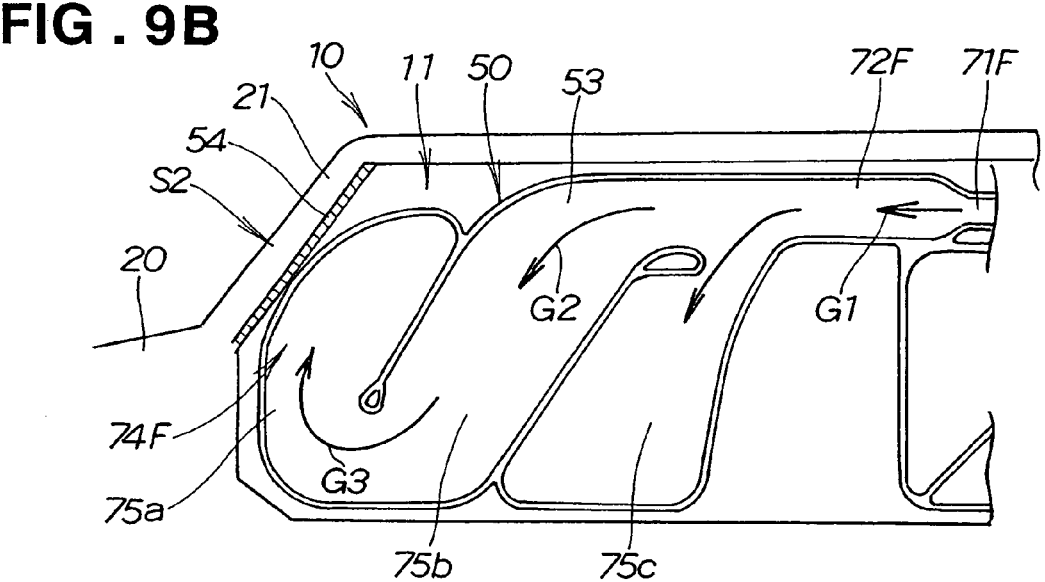

Next, the function of the roof side airbag 53 will be described with reference to FIGS. 1, 3, 9A, 9B and 9C. FIG. 9A shows the occupant protection device 50 in this embodiment at the start of operation; FIG. 9B shows the occupant protection device 50 in this embodiment in the course of operation; and FIG. 9C shows an occupant protection device 50B in a comparative example in the course of operation.

Figure 9C:
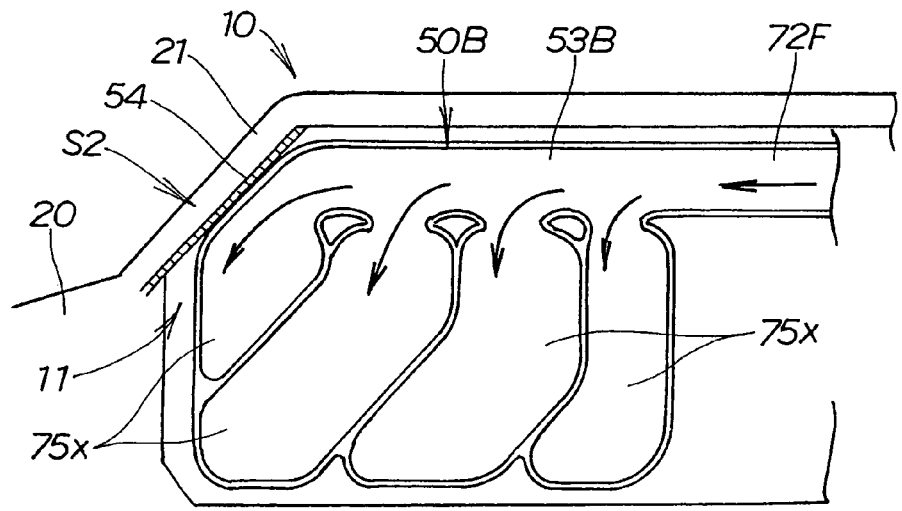
FIG. 9C is a diagram showing an inflated and deployed condition of a roof side airbag according to a comparative example.

The occupant protection device 50B in the comparative example shown in FIG. 9C is configured so that a plurality of inflating portions 75x of a roof side airbag 53B are aligned longitudinally of the vehicle body. The inflating portion 75x located at the front of the inflating portions 75x inflates, breaking a pillar garnish 54. When the roof side airbag 53B is inflated and deployed, a great gas pressure in the front inflating portion 75x causes an excessive load to be applied from the roof side airbag 53B to the pillar garnish 54 at a front pillar.

Compared to this, in this embodiment shown in FIG. 3, gas generated by the inflator 51 flows through the gas inlets 71F, 71R disposed in the longitudinally substantially middle portion into the gas main passages 72F, 72R, and then flows from the gas main passages 72F, 72R to the front bag portion 74F, the middle bag portion 74M and the rear bag portion 74R generally uniformly. Consequently, the folded bag portions 74F, 74M and 74R inflate, deploying along the side glasses 31, 32 and 33 toward the passenger compartment 11 as shown in FIG. 1. This ensures protection of all occupants Ma seated in the three rows of seats 12, 13 and 14.

Also, as shown by arrows in FIGS. 9A and 9B, the gas flowing from the front gas main passage 72F into the front bag portion 74F goes downward and then flows forward and upward.

More specifically, as shown by arrows G1, G2 in FIG. 9A, when the gas starts to flow into the front bag portion 74F, the folded front bag portion 74F is unrolled downward by the gas flowing downward while only the middle and rear inflating portions 75b and 75c inflate and deploy. For example, a portion of the front bag portion 74F folded in the pillar space S2 breaks the pillar garnish 54 and starts to deploy into the passenger compartment 11. At this time, the gas pressure in the front inflating portion 75a among the inflating portions 75a, 75b, 75c is very small. Therefore, when the front bag portion 74F starts to deploy into the passenger compartment 11, an excessive load is not applied from the front bag portion 74F to the pillar garnish 54.

Thereafter, as shown in FIG. 9B, when the gas starts to flow forward and upward as shown by arrow G3, a forward upper portion of the front inflating portion 75a among the inflating portions 75a, 75b, 75c starts to inflate by the gas pressure. Since the forward upper portion of the front inflating portion 75a inflates after the front bag portion 74F deploys from the pillar space S2 into the passenger compartment 11 as described above, an excessive load is not applied to the pillar garnish 54.

Also, since the front gas inlet 71F is disposed in the longitudinally substantially middle portion, a gas inflow path from the front gas inlet 71F to the front bag portion 74F can be shortened, and the pressure loss in the gas inflow path can be reduced. Accordingly, a gas pressure sufficient to inflate and deploy the front bag portion 74F into the passenger compartment 11 is provided. Consequently, all occupants seated in the three longitudinal rows of seats 12, 13, 14 (see FIG. 1) can be more adequately protected.

In this embodiment, at least one of the inflator 51 and the supply pipe 52, and the roof side airbag 53 are mounted to the vehicle body 20 by being fastened together with the bolt 95.

Figure 10:
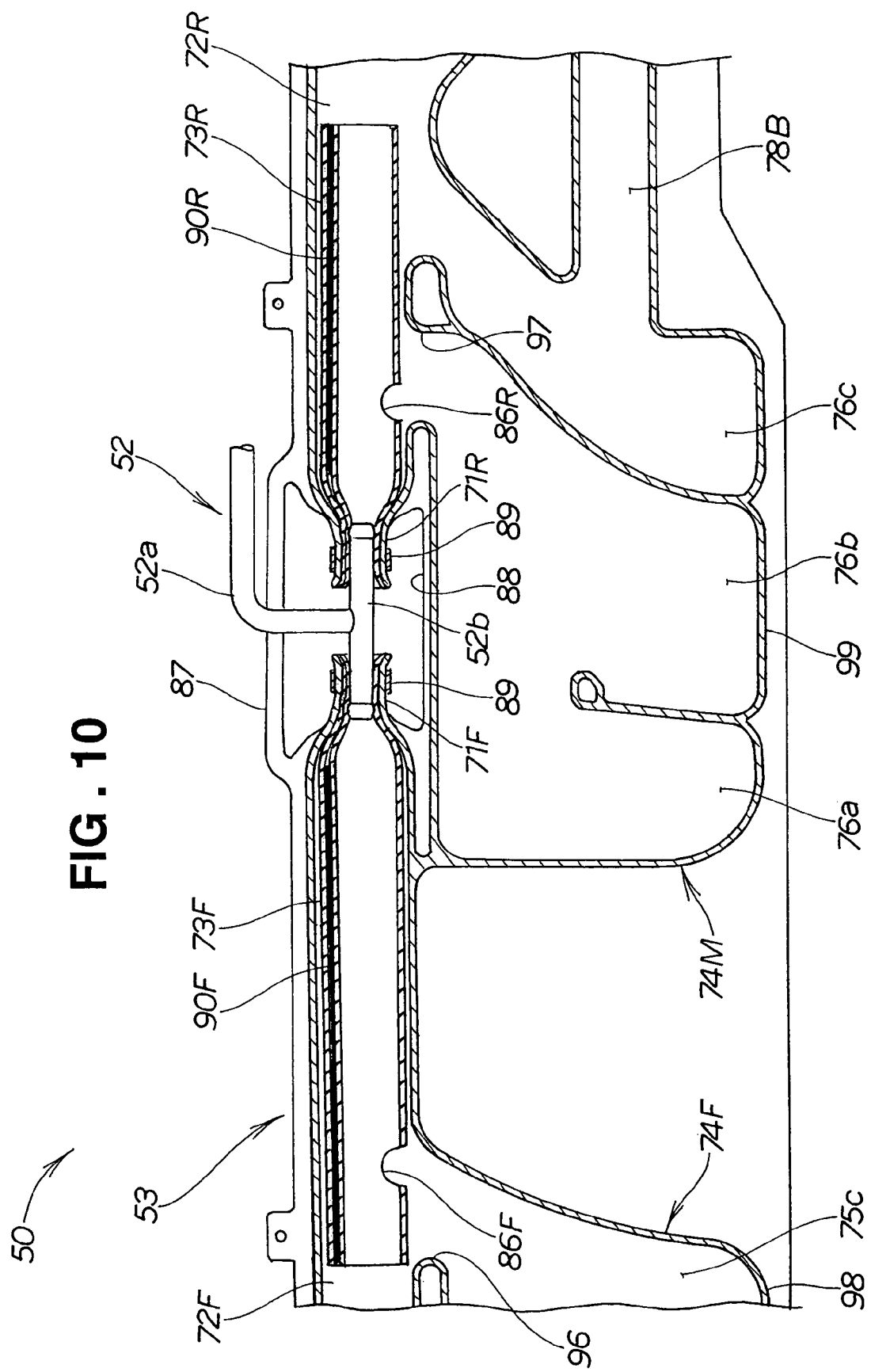
FIG. 10 is an enlarged cross-sectional view of the roof side airbag including inner tubes.

FIG. 10 shows an enlarged middle portion of the occupant protection device 50 shown in FIG. 3. Referring to FIG. 10, the front inner tube 73F has the front discharge hole 86F formed to allow gas to flow into the rear inflating portion 75c of the front bag portion 74F as illustrated in FIG. 3. The discharge hole 86F is formed at a position corresponding to an opening 96 of the rear inflating portion 75c. The rear inner tube 73R has the rear discharge hole 86R formed at a position corresponding to an opening 97 formed in the middle inflating portion 76b of the middle bag portion 74M.

More specifically, the front discharge hole 86F is formed in the front inner tube 73F at a position offset upstream of the gas flow relative to the center of the opening 96 formed in the rear inflating portion 75c. Likewise, the rear discharge hole 86R is formed in the rear inner tube 73R at a position offset upstream of the gas flow relative to the center of the opening 97 formed in the middle inflating portion 76b.

Consequently, when gas from the inflator 51 (see FIG. 3) flows into the front and rear inner tubes 73F, 73R, the gas flows through the front discharge hole 86F and the opening 96 of the rear inflating portion 75c into the rear inflating portion 75c and heads toward a distal end portion 98 thereof. At the same time, the gas flows through the rear discharge hole 86R and the opening 97 of the middle inflating portion 76b into the middle inflating portion 76b and heads toward a distal end portion 99 thereof. The gas discharged from the discharge holes 86F, 86R is discharged in the flow directions of the gas, so that the flows of the discharged gas are not disturbed, and are supplied to the rear inflating portion 75c and the middle inflating portion 76b in a balanced manner, rapidly inflating and deploying the inflating portions 75c and 76b.

Also, since the front and rear discharge holes 86F and 86R are located upstream of the gas flows relative to the centers of the openings 96 and 97 formed in the rear and middle inflating portions 75c and 76b, respectively, peripheral portions of the openings 96 and 97 located downstream from the front and rear discharge holes 86F and 86R, and the inflating portions 75c and 76b are not subjected to excess stress. Thus, an unnecessary stress is not applied to the roof side airbag 53.

The rods 90F, 90R are longitudinally fitted in the front and rear inner tubes 73F, 73R. The rods 90F, 90R are position stabilizing members for preventing the inner tubes 73F, 73R from fluttering by pulsating flows of gas, which can occur when gas flows into the inner tubes 73F, 73R, and maintaining them in predetermined shapes.

The prevention of fluttering of the inner tubes 73F, 73R can stabilize gas flows, and ensure gas supply to the front, middle and rear bag portions 74F, 74M and 74R shown in FIG. 3. As a result, stability in inflation and deployment of the roof side airbag 53 is ensured.

Figure 11A:
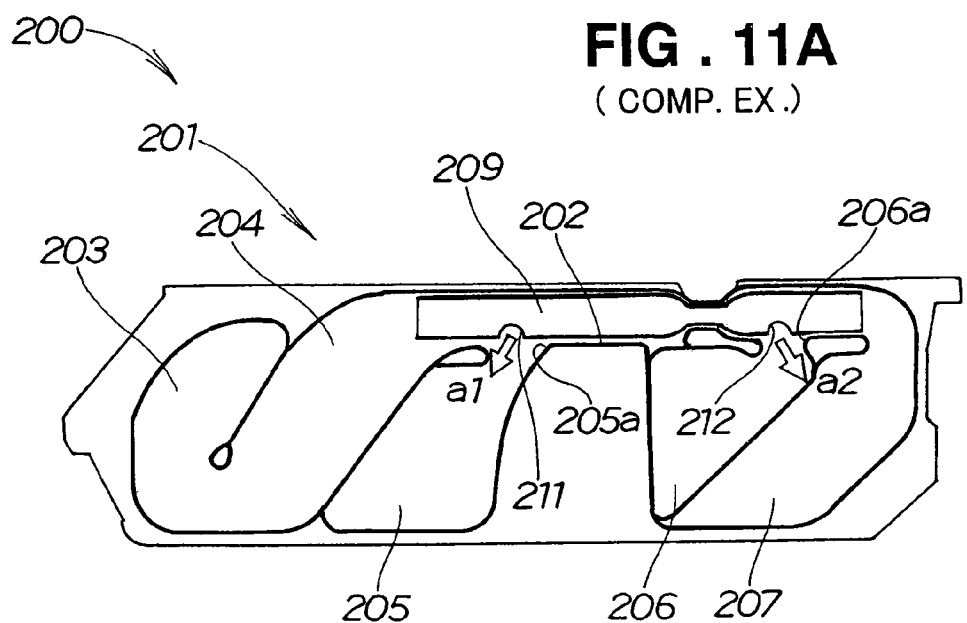
FIG. 11A is a schematic diagram of a roof side airbag in a comparative example.
Figure 11B:
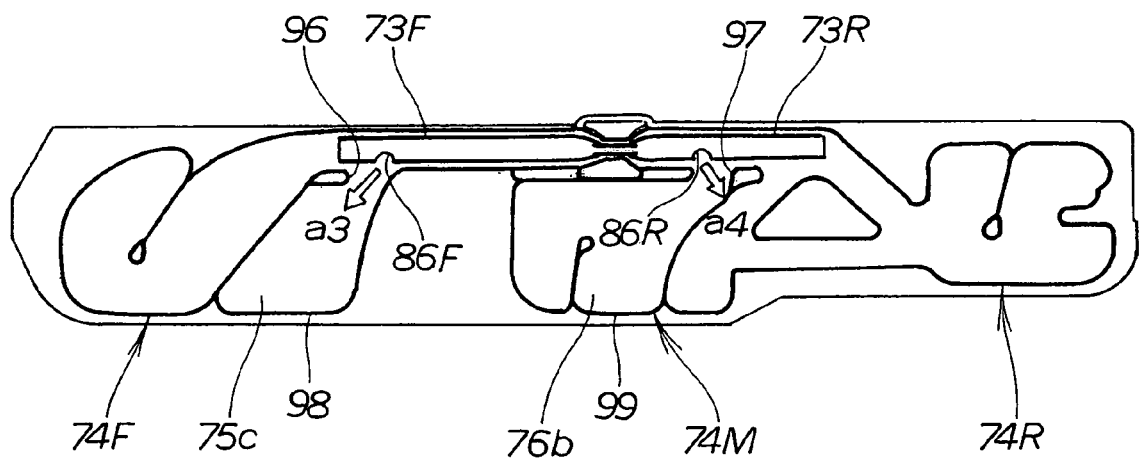
FIG. 11B is a schematic diagram of the roof side airbag in the present invention.

FIG. 11A shows an occupant protection device 200 according to a comparative example; and FIG. 11B shows the occupant protection device 50 according to this embodiment.

A roof side airbag 201 of the occupant protection device 200 in the comparative example shown in FIG. 1A consists of a gas main passage 202 to direct gas generated by an inflator (not shown), a plurality of inflating portions 203, 204, 205, 206 and 207 communicating with the gas main passage 202 for inflation, and an inner tube 209 placed in the gas main passage 202 to distribute the gas to the inflating portions 203 to 207. The inner tube 209 has discharge holes 211, 212 to distribute gas to the inflating portions 203 to 207. The discharge holes 211, 212 are located at the centers of openings 205a, 206a formed in the inflating portions 205, 206, respectively.

In the occupant protection device 200 in the comparative example, however, gas flowing through the inner tube 209 has inertial forces, and thus does not flow downward of the inflating portions 205, 206 but jets out downstream of the gas flows as shown by arrows a1, a2. This can give excessive stresses on peripheral portions of the openings 205a, 206a and wall surfaces of the inflating portions 205, 206, and prevent smooth supply of gas to distal end portions of the inflating portions 205, 206. Consequently, stable inflation and deployment of the inflating portions 205, 206 is prevented.

In the occupant protection device 50 in this embodiment shown in FIG. 11B, the front and rear discharge holes 86F, 86R formed in the front and rear inner tubes 73F, 73R are located upstream of the gas flows relative to the centers of the openings 96, 97 formed in the rear and middle inflating portions 75c, 76b, respectively. This allows gas discharged from the front and rear discharge holes 86F, 86R to flow toward the centers of the openings 96, 97 as shown by arrows a3, a4 by inertial forces, and flow toward the distal end portions 98, 99 of the rear and middle inflating portions 75c, 76b without giving stress on the rear and middle inflating portions 75c, 76b.

Next, the operation with the position stabilizing members 90F, 90R fitted in the inner tubes 73F, 73R will be described in comparison with a comparative example with reference to FIGS. 12A to 12C. FIGS. 12A and 12B show an occupant protection device 220 in the comparative example; and FIG. 12C shows the occupant protection device 50 in this embodiment.

A roof side airbag 221 of the occupant protection device 220 in the comparative example shown in FIG. 12A consists of a gas main passage 222 to direct gas generated by an inflator (not shown), a plurality of inflating portions 223, 224, 225, 226 and 227 communicating with the gas main passage 222 for inflation, and an inner tube 229 placed in the gas main passage 222 to distribute the gas to the inflating portions 223 to 227. The inner tube 229 has discharge holes 231, 232 to distribute gas to the inflating portions 223 to 227.

As shown in FIG. 12B, in the occupant protection device 220 in the comparative example shown in FIG. 12A, gas generated by the inflator (not shown) can become pulsating flows. The pulsating flows of gas cause fluttering at distal end portions of the inner tube 229. As a result, the distal end portions of the inner tube 229 can get into the inflating portions 225, 226 as shown by arrows b1, b2, preventing inflation and deployment of the roof side airbag 221.

Compared to this, in the embodiment shown in FIG. 12C, the position stabilizing members 90F, 90R made from rods are fitted in the front and rear inner tubes 73F, 73R to maintain the shapes of the front and rear inner tubes 73F, 73R. As a result, when pulsating flows of gas flow into the front and rear inner tubes 73F, 73R, the front and rear inner tubes 73F, 73R are prevented from fluttering, and the gas properly flows into the front, middle and rear bag portions 74F, 74M, 74R including a plurality of inflating portions.

As shown in FIG. 10, for the position stabilizing members in this embodiment, the rods 90F, 90R made from steel round bars are exemplarily used, but the present invention is not limited thereto. They may be any members which stabilize the shapes of the inner tubes 73F, 73R, such as plates, pipes or wire rods, or may be any members for which materials having position stabilizing functions such as shape stabilizing materials are used.

Next, the protector cloth mounting structure 61, the airbag fastening structure 62, and the mounting bracket structure 63 described above will be described with reference to FIGS. 13 to 21.

First, the protector cloth mounting structure 61 will be described with reference to FIGS. 13 to 15.

The protector cloth mounting structure 61 is configured so that a protector cloth 102 to protect the roof side airbag 53 is sewn to the cover 91 covering the folded roof side airbag 53 with first sewing threads 103, 103 and a second sewing thread 104. Of the first and second sewing threads 103, 103 and 104 of the seams, the second sewing thread 104 for sewing an area 113 from which the roof side airbag 53 is inflated and deployed is weakened so as to be torn by an inflating and deploying force of the roof side airbag 53.

The inflating and deploying force is a force produced by the roof side airbag 53 when inflating and deploying.

The roof side airbag 53 is rolled up in a spiral shape with a lower edge portion 53c at the center. The airbag 53 has a mounting portion 142 formed at an upper edge portion 53d thereof. The mounting portion 142 extends upward through an elongate hole 105 formed in the cover 91 and an elongate hole 106 formed in the protector cloth 102.

The cover 91 is made from a cloth sewn up in a tubular shape, and encloses the spirally rolled roof side airbag 53 to prevent entrance of foreign matter (not shown) into the roof side airbag 53 and keep the roof side airbag 53 in the spirally rolled condition. The cover 91 has a perforation 109 formed in a peripheral wall 108 and extending longitudinally. When the roof side airbag 53 is filled with gas from the inflator 51 (see FIGS. 1 to 3), the perforation 109 is torn, and the roof side airbag 53 inflates and deploys.

The protector cloth 102 is sewn to the peripheral wall 108 of the cover 91 with the first and second sewing threads 103, 103 and 104. The elongate hole 106 through which the mounting portion 142 of the roof side airbag 53 passes is formed in an upper end portion 102a of the protector cloth 102. The protector cloth 102 is a protective member made from a hard cloth so as not to be torn when brought into contact with a protrusion 118a of a spot weld 118 produced when an inner panel 114 and a stiffener 119 are spot-welded together.

When the protector cloth 102 is sewn to the cover 91, the protector cloth 102 is placed on the cover material of the cover 91 before it is sewn up in a tubular shape, and sewing portions 102b and 102c at the upper end portion 102a of the protector cloth 102 on both sides of the elongate hole 106 are sewn to the cover 91 with the strong first sewing threads 103.

In addition, a lower end portion 102d of the protector cloth 102 is sewn to the cover 91 with the weak second sewing thread 104. In this state, the protector cloth 102 covers the perforation 109 formed in the cover 91. A sewing portion 102e sewn with the second sewing thread 104 is located near the perforation 109.

The sewing portions 102b and 102c sewn with the first sewing threads 103, 103 are located above the sewing portion 102e sewn with the second sewing thread 104.

After the protector cloth 102 is sewn to the cover material, the cover material is sewn up in a tubular shape to constitute the cover 91.

The tubular cover 91 encloses the spirally rolled roof side airbag 53. In this state, the perforation 109 of the cover 91 is positioned at the location of the area 113 from which the roof side airbag 53 is inflated and deployed.

At the same time, the mounting portion 142 of the roof side airbag 53 is protruded through the elongate hole 105 in the cover 91 and the elongate hole 106 in the protector cloth 102.

Mounting holes 142a, 142a (only one shown) in the protruded mounting portion 142 are aligned with mounting holes 115, 115 (only one shown) on the roof side (in the inner panel) 114 of the vehicle. Bolts 116, 116 are inserted into the mounting holes 142a, 142a and 115, 115. The inserted bolts 116, 116 are screw-connected to nuts 117, 117 (only one shown) to mount the mounting portion 142 to the inner panel 114. The protector cloth 102 faces the protrusion 118a of the spot weld 118 on the inner panel 114.

With the perforation 109 in the cover 91 positioned at the area 113 from which the roof side airbag 53 inflates and deploys, the sewing portion 102e sewn with the second sewing thread 104 is located near the area 113 from which the roof side airbag 53 inflates and deploys.

Part of the cover 91 facing the protrusion 118a of the spot weld 118 on the inner panel 114 is covered by the protector cloth 102. This ensures protection of the cover 91 and the roof side airbag 53 from the protrusion 118a of the spot weld 118.

Also, the weakened second sewing thread 104 can ensure tearing of the second sewing thread 104 after the perforation 109 is torn by the inflating and deploying force of the roof side airbag 53.

As described above, with the protector cloth mounting structure 61, the spirally rolled roof side airbag 53 covered by the cover 91 is attached to the protector cloth 102. This eliminates the operation of attaching the protector cloth 102 to the roof side airbag 53 with tape (not shown), which has been necessary in the related art, during the mounting operation of the roof side airbag 53.

Also, the protector cloth 102 is sewn to the cover 91 with the first and second sewing threads 103, 103 and 104 across the entire area (specifically, across the full width of the protector cloth 102), so that the entire surface of the protector cloth 102 is brought into close contact with the cover 91. With this, foreign matter is unlikely to enter through a gap between the protector cloth 102 and the cover 91.

Figure 15:
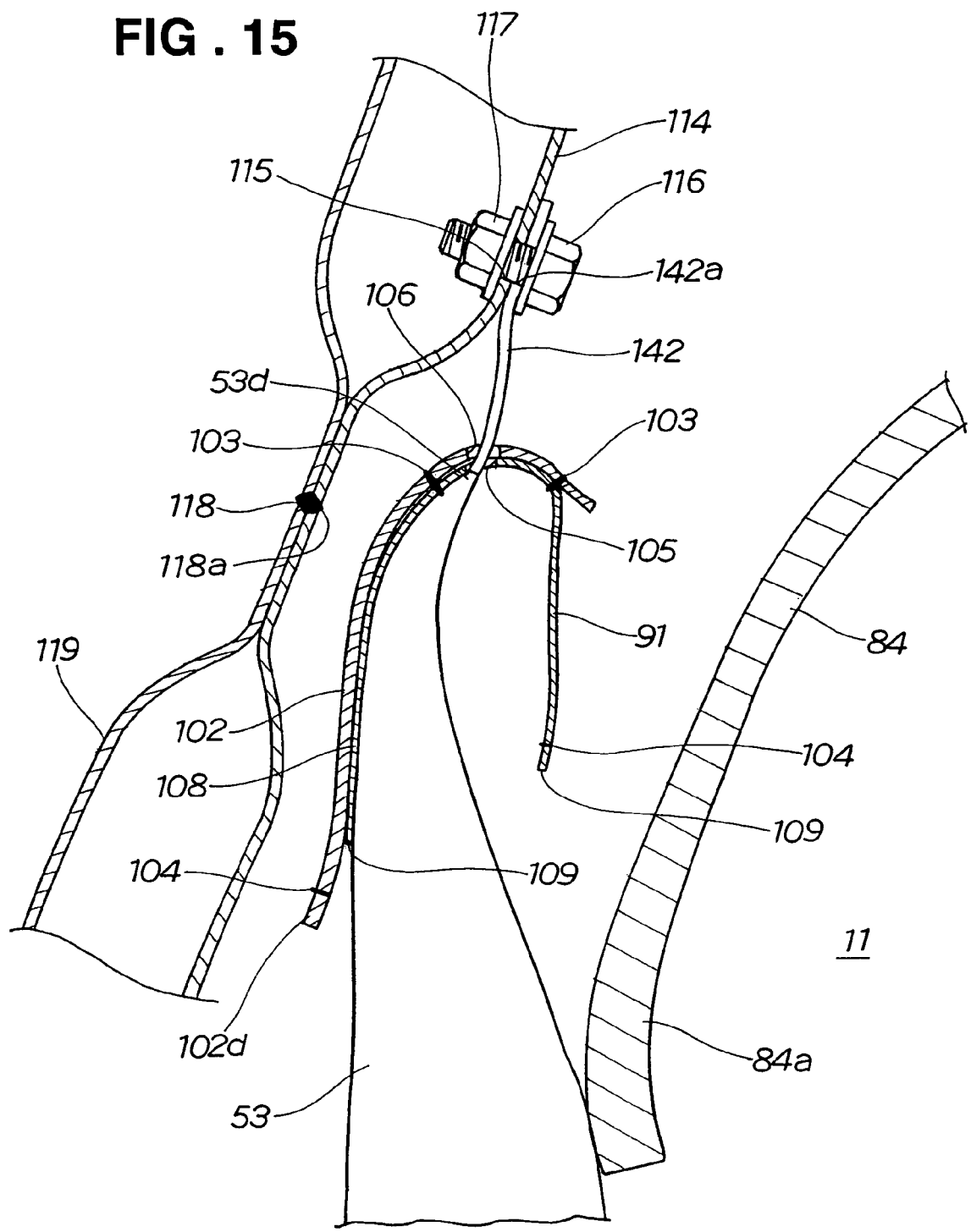
FIG. 15 is a cross-sectional view of the protector cloth mounting structure, showing the roof side airbag shown in FIG. 14 in an inflated and deployed condition.

FIG. 15 is a diagram illustrating the function of the mounting structure of the protector cloth 102 provided at the occupant protection device 50 according to the present invention.

The roof side airbag 53 is filled with gas from the inflator 51 (see FIGS. 1 to 3), so that the roof side airbag 53 inflates and deploys. The inflating and deploying force of the roof side airbag 53 tears the perforation 109 in the cover 91.

After the perforation 109 is torn, the second sewing thread 104 with which the lower end portion 102d of the protector cloth 102 is sewn to the cover 91 is torn by the inflating and deploying force of the roof side airbag 53.

Of the first and second sewing threads 103, 103 and 104 with which the protector cloth 102 is sewn to the cover 91, the weak second sewing thread 104 is used to sew the area 113 from which the roof side airbag 53 is inflated and deployed. Consequently, when the roof side airbag 53 is inflated and deployed, the second sewing thread 104 is properly torn by the inflating and deploying force to allow the roof side airbag 53 to well inflate and deploy.

Figure 14:
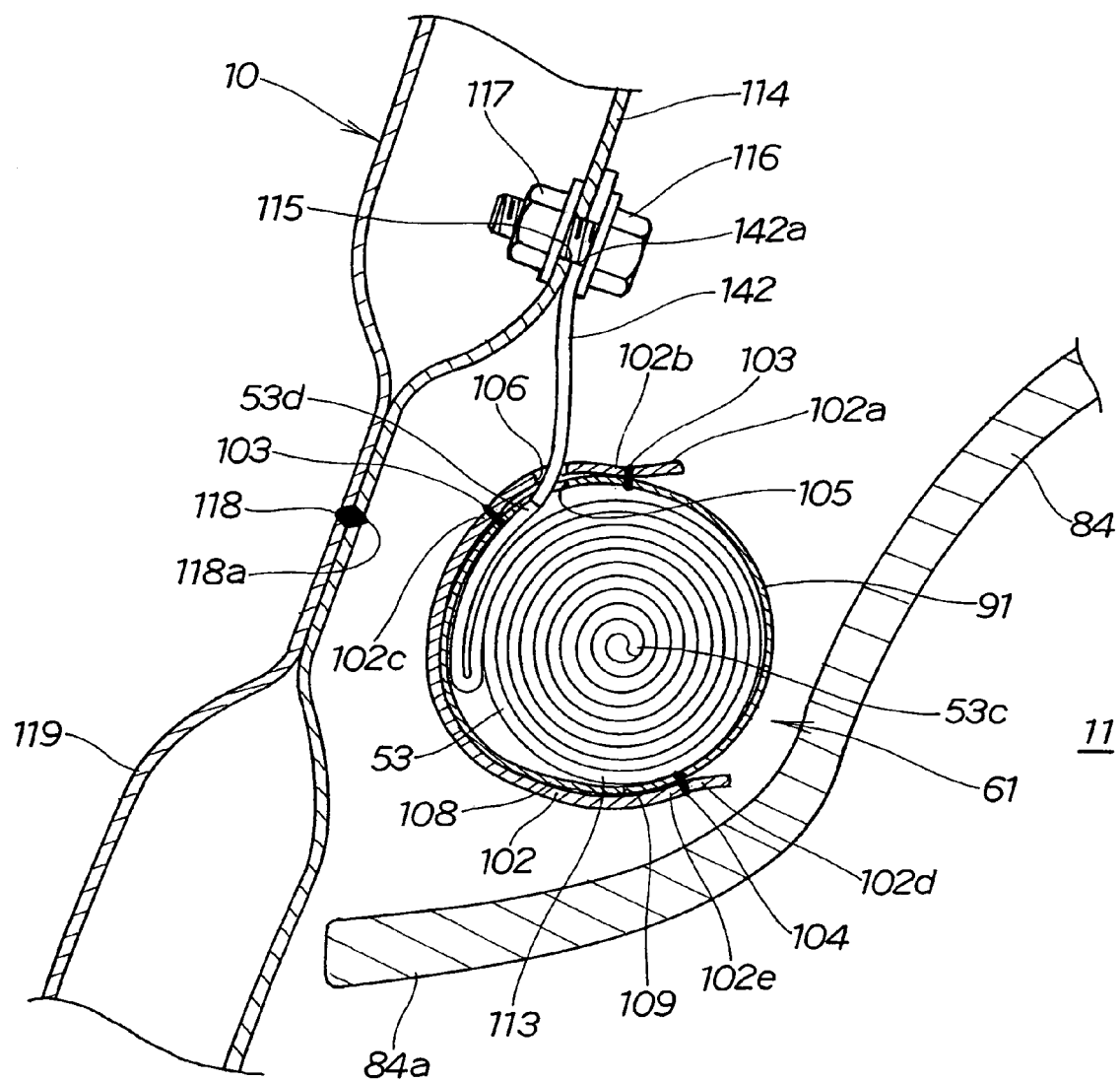
FIG. 14 is a cross-sectional view of the protector cloth mounting structure shown in FIG. 13.

As described with FIG. 14, the sewing portions 102b and 102c at the upper end portion 102a of the protector cloth 102 are sewn to the cover 91 with the strong first sewing threads 103, and the lower end portion 102d (sewing portion 102e) is sewn to the cover 91 with the weak second sewing thread 104. Consequently, when the roof side airbag 53 inflates and deploys, the second sewing thread 104 is torn while the first sewing threads 103 are not torn, so that the lower end portion 102d of the protector cloth 102 is hung downward as shown in FIG. 15.

With the lower end portion 102d of the protector cloth 102 hung downward, when the roof side airbag 53 inflates and deploys, part of the peripheral wall 108 of the cover 91 facing the inner panel 114 is covered by the protector cloth 102. Consequently, if the protector cloth 102 comes into contact with the protrusion 118a of the spot weld 118, the roof side airbag 53 is protected from the protrusion 118a of the spot weld 118.

When the roof side airbag 53 inflates and deploys, the roof side airbag 53 forces open a lower edge portion 84a of the roof lining 84 toward the passenger compartment 11, and inflates and deploys into the passenger compartment 11 through a space between the lower edge portion 84a of the roof lining 84 and the inner panel 114.

Figure 16:
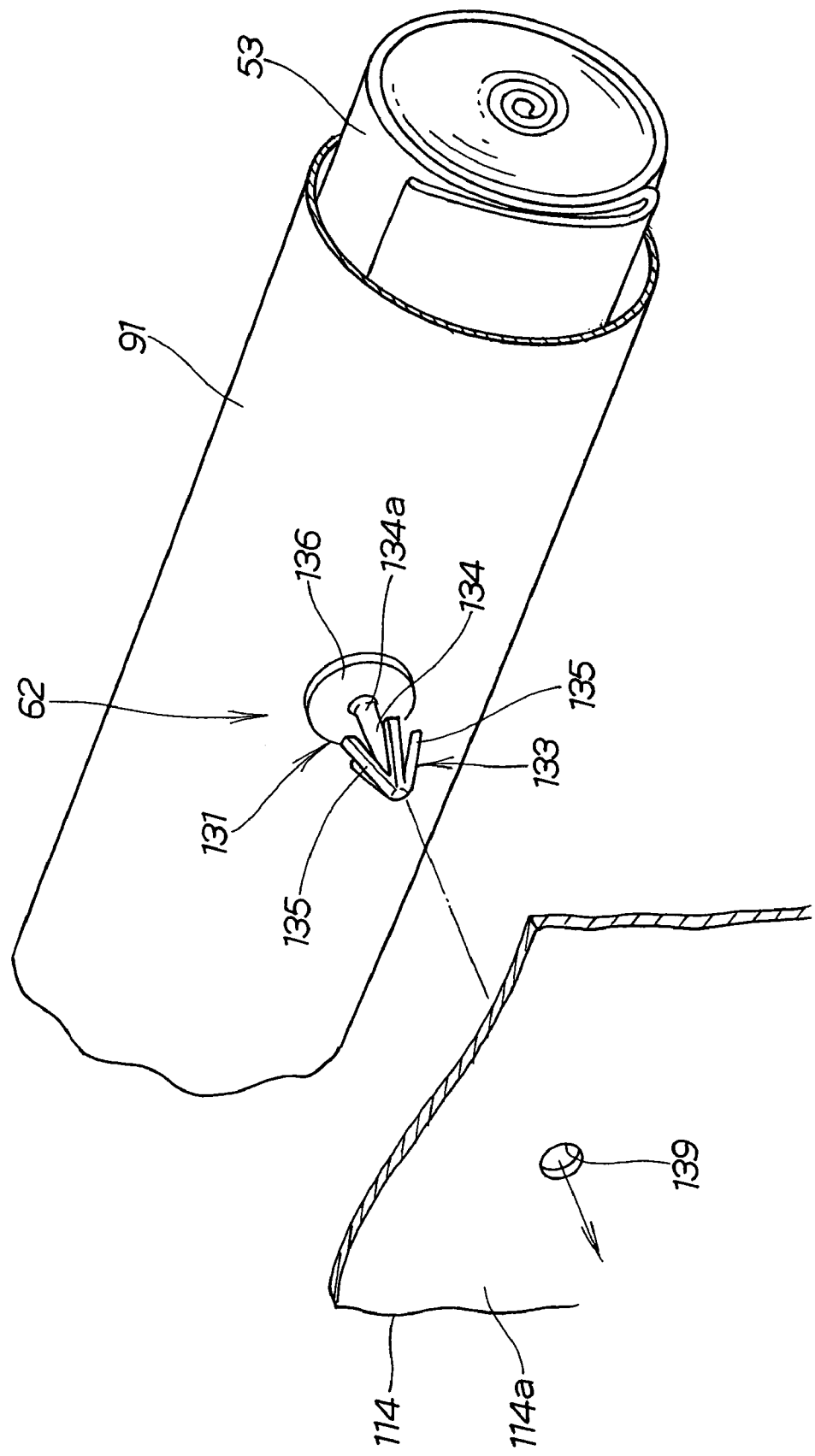
FIG. 16 is a perspective view of a roof side airbag fastening structure in the occupant protection device according to the present invention.
Figure 17:
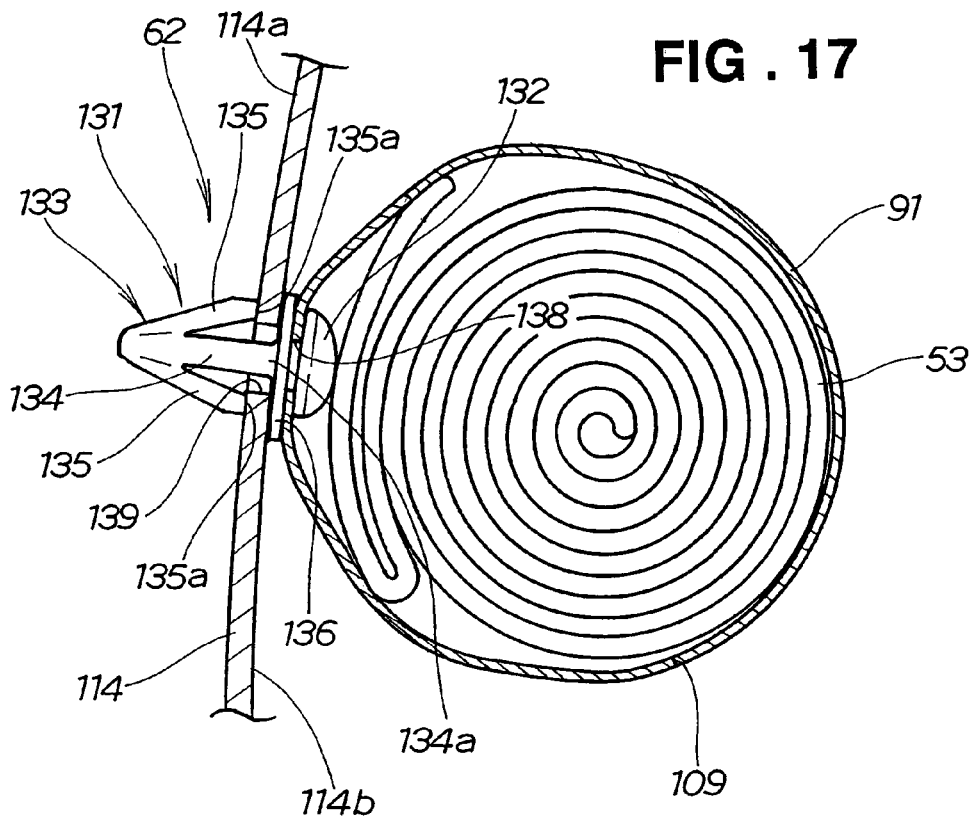
FIG. 17 is a cross-sectional view of the roof side airbag fastening structure shown in FIG. 16.

Next, the airbag fastening structure 62 will be described with reference to FIGS. 16 and 17.

The airbag fastening structure 62 includes a clip 131 to mount the cover 91 enclosing the spirally rolled roof side airbag 53 to the inner panel 114.

A head 132 of the clip 131 is disposed within the cover 91. An engaging portion 133 of the clip 131 is protruded outward from inside the cover 91. The engaging portion 133 is engaged with the inner panel 114. The engaging portion 133 has an engaging shaft 134 and four engaging claws 135.

The clip 31 also includes a holding portion 136 to abut on the inner surface of the inner panel 114 at a proximal portion 134a of the engaging shaft 134. The engaging portion 133 and the holding portion 136 sandwich the inner panel 114 so that the clip 131 is mounted to the inner panel 114. The holding portion 136 is provided at a certain distance from the head 132 provided at the engaging shaft 134. The four engaging claws 135 are elastically deformable, and provided at the distal end of the engaging shaft 134.

The proximal portion 134a of the clip 131 is fitted in a mounting hole 138 formed in the cover 91. Since the cover 91 is made from cloth, the mounting hole 138 can be deformed into an elongate hole by pulling the cover 91. Through the deformed mounting hole 138, the head 132 of the clip 131 is fitted in and then the proximal portion 134a is fitted in to mount the clip 131 to the cover 91.

The distance between the head 132 and the holding portion 136 is formed to be slightly greater than the thickness of the cover 91.

With the clip 131 mounted to the mounting hole 139 in the inner panel 114, the distance between rear ends 135a of the engaging claws 135 and the holding portion 136 is formed to be slightly smaller than the thickness of the inner panel 114, for example. Consequently, the inner panel 114 is securely held between the rear ends 135a of the engaging claws 135 and the holding portion 136.

When the clip 131 is mounted to the mounting hole 139 in the inner panel 114, the holding portion 136 is took from the outside of the cover 91 to insert the engaging claws 135 into the mounting hole 139. In this state, the holding portion 136 is pressed from outside the cover 91 to the mounting hole 139 so that the engaging claws 135 abut the periphery of the mounting hole 139. The engaging claws 135 elastically deform toward the engaging shaft 134. The engaging claws 135, elastically deforming toward the engaging shaft 134, pass through the mounting hole 139. After the engaging claws 135 pass through the mounting hole 139, the engaging claws 135 return to the original positions. The rear ends 135a of the engaging claws 135 abut on an outer surface 114a of the inner panel 114. At the same time, the holding portion 136 abuts on an inner surface 114b of the inner panel 114. Thus, the rear ends 135a of the engaging claws 135 and the holding portion 136 sandwich the inner panel 114, fixing the clip 131 to the inner panel 114.

When the clip 131 is fitted to the inner panel 114 through the mounting hole 139 in the inner panel 114, the holding portion 136 is pressed from outside the cover 91 to fit the engaging portion 133 to the mounting hole 139, as described above. Thus, there is no need to apply an excess force to the cover 91. This prevents the cover 91 from being torn and dislocated from the head 132 of the clip 131 when the clip 131 is being mounted to the inner panel 114.

The above-described air bag fastening structure 62 in this embodiment is a simple mounting structure using the clip 131, and facilitates the mounting of the cover 91 and the roof side airbag 53 to the inner panel 114 with the clip 131. Consequently, the cover 91 and the roof side airbag 53 are disposed without being dislocated from the inner panel 114; the roof side airbag 53 is disposed properly along the inner panel 114; and the mounting position of the roof side airbag 53 is stabilized.

On the other hand, when the roof side airbag 53 inflates and deploys, the cover 91 is torn and disengaged from the head 132 of the clip 131. Consequently, the clip 131 is kept mounted to the inner panel 114, and the clip 131 does not fly into the passenger compartment 11.

The airbag fastening structure 62 illustrated in this embodiment has been described with the example in which the holding portion 136 is provided at the proximal portion 134a of the engaging shaft 134, and the holding portion 136 is pressed against the inner panel 114 to mount the clip 131 to the inner panel 114, but the present invention is not limited thereto. Without providing the holding portion 136 at the proximal portion 134a of the engaging shaft 134, it is possible to mount the cover 91 and the roof side airbag 53 to the inner panel 114 with the clip 131.

Next, the mounting bracket structure 63 will be described with reference to FIGS. 2 and 18 to 21.

As illustrated with FIG. 2, the occupant protection device 50 is provided with the mounting bracket structure 63 to mount the airbag 53 to the inner panel 114 of the vehicle roof.

The mounting bracket structure 63 includes first and second mounting brackets (mounting brackets) 151, 152. Of the first and second mounting brackets 151, 152, the first mounting bracket 151 located above the forward middle pillar 22 constituting a part of a window frame has strength lower than the strength of the second mounting bracket 152 (that is, the strength of the second mounting bracket 152 is higher than that of the first mounting bracket 151). Impact absorption by the first and second mounting brackets 151, 152 is made suitable for occupants Ma striking the first and second mounting brackets 151, 152.

Figure 18:
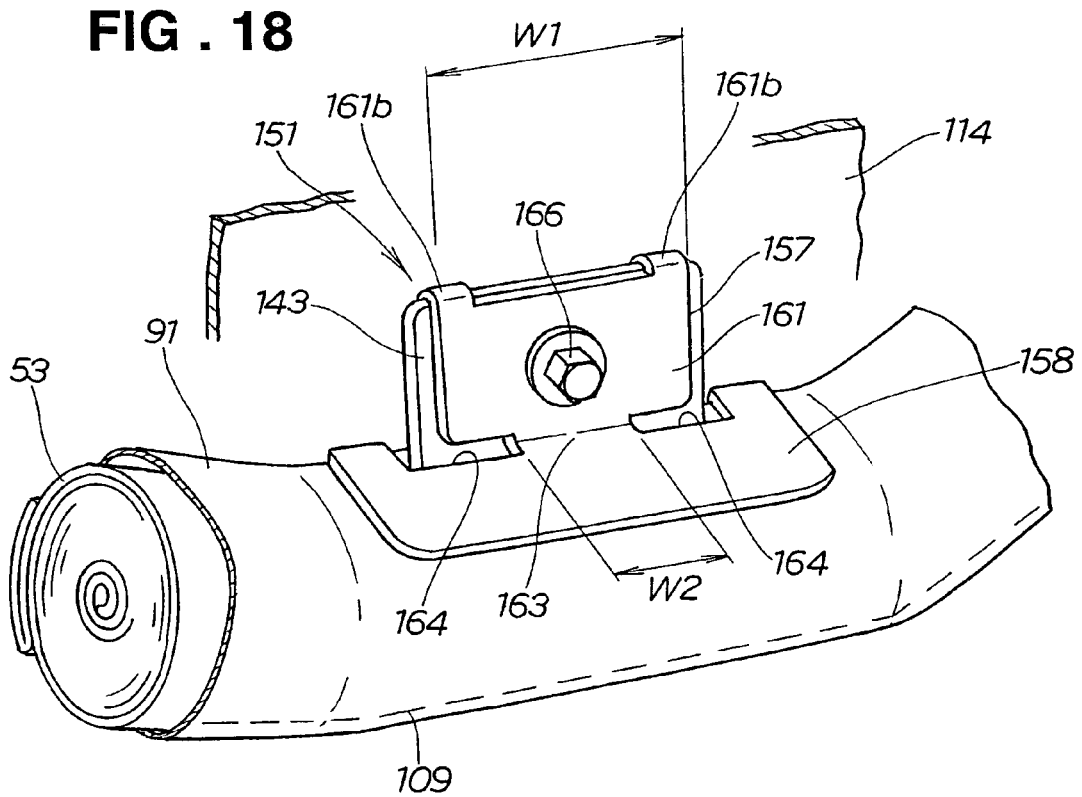
FIG. 18 is a perspective view of a first mounting bracket structure in the occupant protection device according to the present invention.
Figure 19:
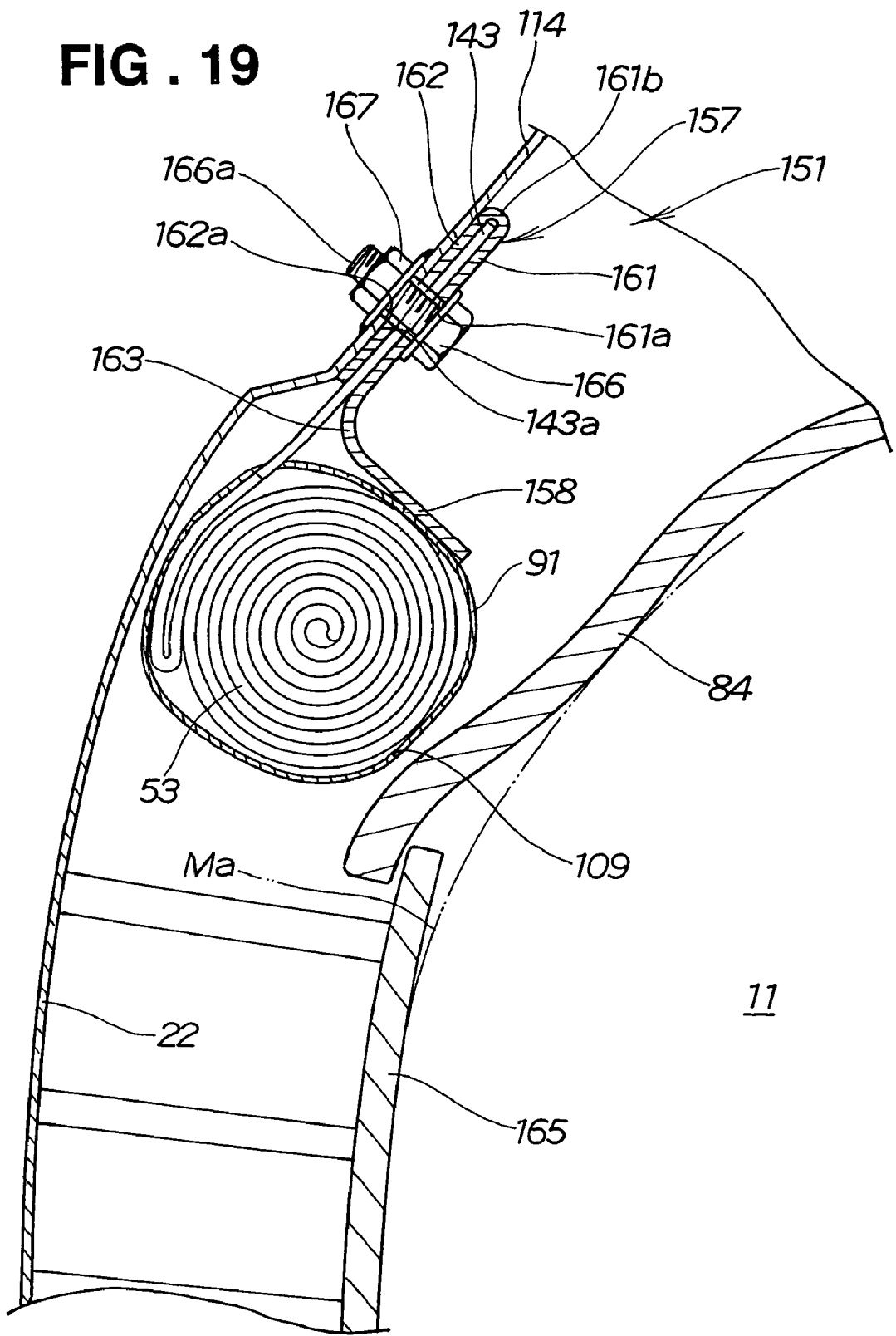
FIG. 19 is a cross-sectional view of the first mounting bracket structure shown in FIG. 18.

As shown in FIGS. 18 and 19, the first mounting bracket 151 includes a mounting portion 157 mounted to the inner panel 114, and a restricting portion 158 to restrict the inflating and deploying direction of the roof side airbag 53.

The mounting portion 157 includes a mounting plate 161 and a holding plate 162. The mounting plate 161 and the holding plate 162 are connected by folded portions 161b, 161b formed at the upper edge, and formed in parallel at a certain space. The mounting plate 161 has a mounting hole 161a formed substantially in the center. The holding plate 162 has a mounting hole 162a formed coaxially with the mounting hole 161a.

A mounting portion 143 of the roof side airbag 53 is held between the mounting plate 161 and the holding plate 162. A mounting hole 143a in the mounting portion 143 is disposed coaxially with the mounting hole 161a of the mounting plate 161 and the mounting hole 162a of the holding plate 162.

The mounting portion 157 is placed at a mounting position on the inner panel 114, and a bolt 166 is inserted into the mounting holes 161a, 143a and 162a. A thread 166a of the bolt 166 protruded from the mounting hole 162a is screw-connected to a nut 167, so that the mounting portion 143 of the roof side airbag 53 is mounted to the inner panel 114 by the mounting portion 157.

The restricting portion 158 is a substantially rectangular plate substantially orthogonally connected to the mounting plate 161 by a connecting portion 163. The restricting portion 158 is located on the upper side of the cover 91 to restrict the roof side airbag 53 when deploying so that the roof side airbag 53 inflates and deploys downward.

The connecting portion 163 is provided with slits 164, 164 at its both sides, so that the width W2 of the connecting portion 163 is made smaller than the width W1 of the mounting portion 157. Consequently, the strength of the first mounting bracket 151 located above the forward middle pillar 22 can be reduced. Therefore, when a small impact is applied to the first mounting bracket 151, the small impact can be held by the first mounting bracket 151.

The reason for reducing the strength of the first mounting bracket 151 located above the forward middle pillar 22 will now be described.

The forward middle pillar 22 is provided with a forward middle pillar garnish (pillar garnish) 165 on the passenger compartment 11 side. When an occupant Ma shown by imaginary lines strikes the first mounting bracket 151 above the forward middle pillar 22, the occupant Ma also strikes the forward middle pillar garnish 165 at the same time as shown in FIG. 19. When the occupant Ma strikes the forward middle pillar garnish 165, part of the impact is absorbed by the forward middle pillar garnish 165. Consequently, when the occupant Ma strikes the first mounting bracket 151 above the forward middle pillar 22, the impact applied to the first mounting bracket 151 is made small.

For this reason, the strength of the first mounting bracket 151 located above the forward middle pillar 22 is reduced. Consequently, when a small impact is applied to the first mounting bracket 151, the small impact is held by the first mounting bracket 151.

The restricting portion 158 restricts the inflating and deploying direction of the roof side airbag 53 to make the roof side airbag 53 inflate and deploy toward the roof lining 84. The roof lining 84 is forced open by the roof side airbag 53, and through a space between the roof lining 84 and the forward middle pillar garnish 165, the roof side airbag 53 inflates and deploys into the passenger compartment 11.

Figure 20:
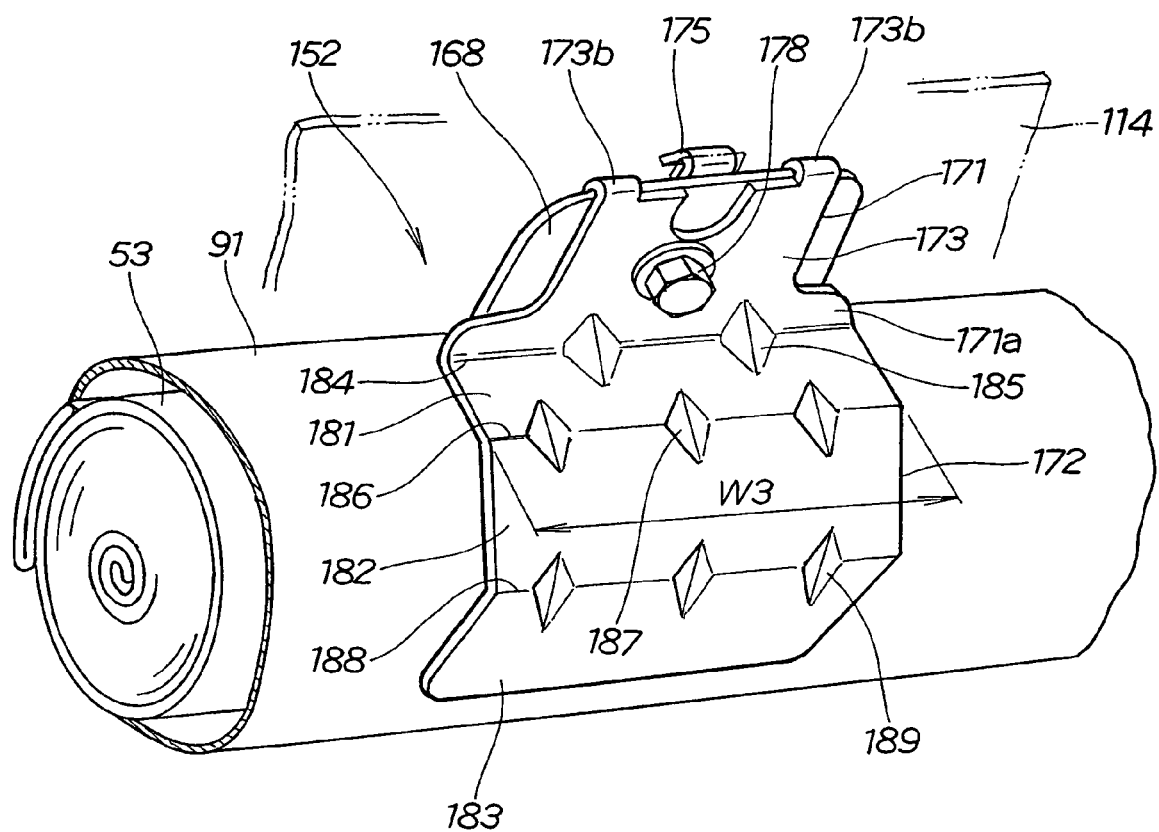
FIG. 20 is a perspective view of a second mounting bracket structure in the occupant protection device according to the present invention.
Figure 21:
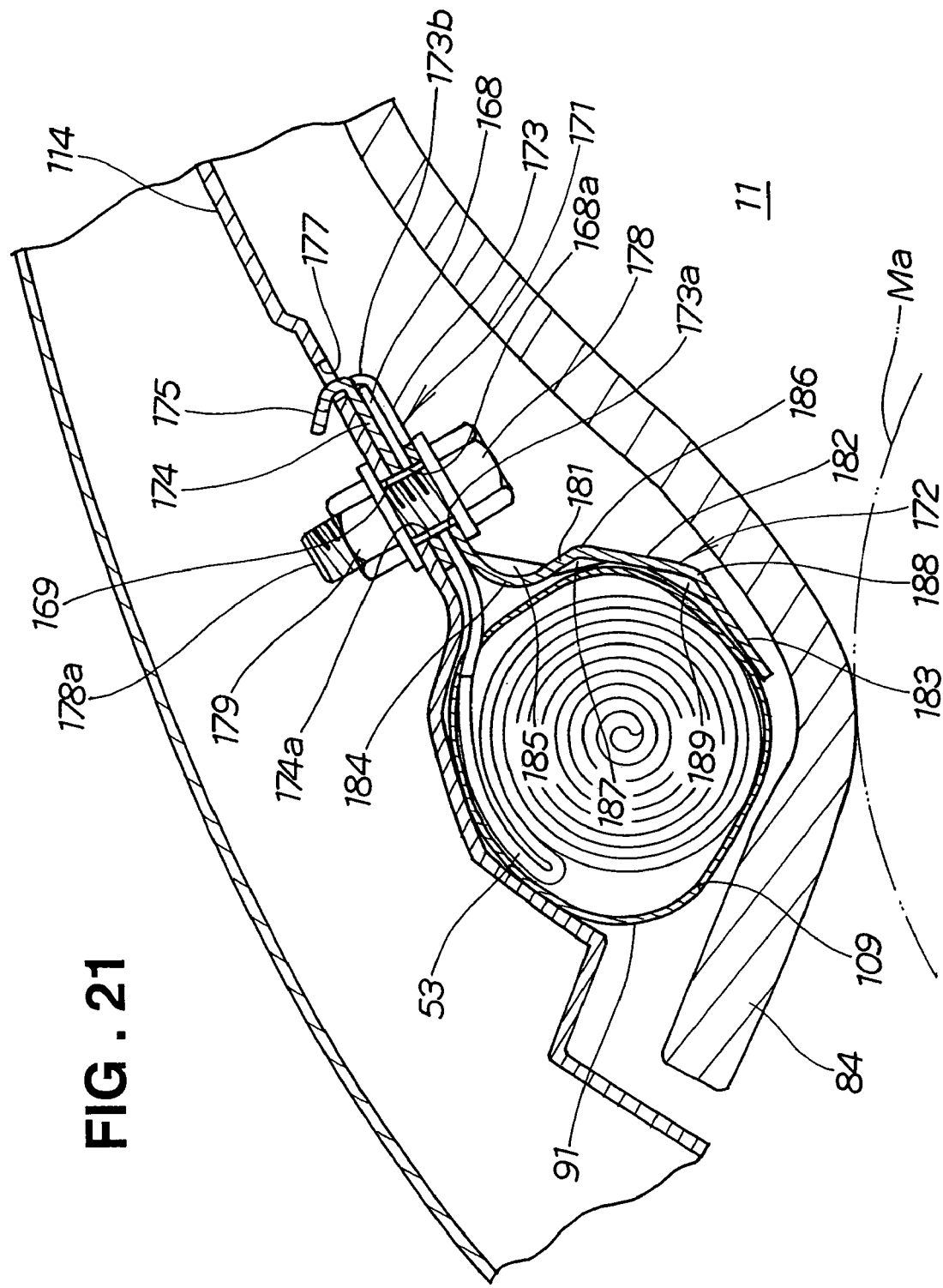
FIG. 21 is a cross-sectional view of the second mounting bracket structure shown in FIG. 20.

Next, the second mounting bracket 152 will be described with reference to FIGS. 20 and 21.

The second mounting bracket 152 includes a mounting portion 171 mounted to the inner panel 114 and a restricting portion 172 to restrict the inflating and deploying direction of the roof side airbag 53.

The mounting portion 171 includes a mounting plate 173 and a holding plate 174. The mounting plate 173 and the holding plate 174 are connected by folded portions 173b, 173b formed at the upper edge, and formed in parallel at a certain space. The mounting plate 173 has a mounting hole 173a formed substantially in the center. The holding plate 174 has a hook 175 formed at its upper middle edge portion. The hook 175 is a member to be engaged with an engagement hole 177 formed in the inner panel 114.

A mounting portion 168 of the roof side airbag 53 is held between the mounting plate 173 and the holding plate 174. A mounting hole 168a in the mounting portion 168 is disposed coaxially with the mounting hole 173a in the mounting plate 173 and a mounting hole 174a in the holding plate 174.

The mounting portion 171 is placed at a mounting position on the inner panel 114, and a bolt 178 is inserted into the mounting holes 173a, 168a and 174a. A thread 178a of the bolt 178 protruded from the mounting hole 169 is screw-connected to a nut 179 to mount the mounting portion 168 of the roof side airbag 53 to the inner panel 114 by the mounting portion 171.

A lower edge portion 171a of the mounting portion 171 has opposite sides extended longitudinally of the roof side airbag 53, so that the lower edge portion 171a is formed with a large width W3. The restricting portion 172 extends from the lower edge portion 171a of the mounting portion 171 toward the passenger compartment 11.

The restricting portion 172 includes a first restricting portion 181 extending substantially orthogonally to the mounting plate 173 of the mounting portion 171 toward the passenger compartment 11, a second restricting portion 182 extending with inclination from the first restricting portion 181, and a third restricting portion 183 extending with inclination from the second restricting portion 182.

The first to third restricting portions 181 to 183 are provided along the cover 91. A first bent connecting portion 184 between the lower edge portion 171a of the mounting portion 171 and the first restricting portion 181 is formed with first beads 185, 185 at two locations. A second bent connecting portion 186 between the first restricting portion 181 and the second restricting portion 182 is formed with second beads 187 at three locations. A third bent connecting portion 188 between the second restricting portion 182 and the third restricting portion 183 is formed with third beads 189 at three locations.

The restricting portion 172 is located on the upper side of the cover 91, and has the first to third restricting portions 181 to 183 disposed along the cover 91 to allow the roof side airbag 53 to inflate and deploy leftward and downward.

The first beads 185, 185 are reinforcing portions protruded outward of the first bent connecting portion 184 located between the lower edge portion 171a of the mounting portion 171 and the first restricting portion 181.

Each of the second beads 187 is a reinforcing portion protruded inward of the second bent connecting portion 186 located between the first restricting portion 181 and the second restricting portion 182.

Each of the third beads 189 is a reinforcing portion protruded inward of the third bent connecting portion 188 located between the second restricting portion 182 and the third restricting portion 183.

Thus forming the first to third reinforcing beads 185, 187 and 189 in the mounting portion 171 and the restricting portion 172 reinforces the second mounting bracket 152 and increases the strength of the second mounting bracket 152. Consequently, when a relatively great impact is applied to the second mounting bracket 152, the great impact can be held by the second mounting bracket 152.

Now, the reason for increasing the strength of the second mounting bracket 152 located off the forward middle pillar 22 (see FIG. 19) will be described.

When an occupant Ma strikes the second mounting bracket 152 located off the forward middle pillar 22 (see FIG. 19), the occupant Ma shown by imaginary lines only strikes the second mounting bracket 152 without striking the forward middle pillar garnish 165 (see FIG. 19). Consequently, when the occupant Ma strikes the second mounting bracket 152 located off the forward middle pillar 22, the impact applied to the second mounting bracket 152 is relatively great.

Therefore, the strength of the second mounting bracket 152 located off the forward middle pillar 22 is increased. Consequently, when a relatively great impact is applied to the second mounting bracket 152, the great impact can be held by the second mounting bracket 152.

When the roof side airbag 53 inflates and deploys, the restricting portion 172 restricts the inflating and deploying direction of the roof side airbag 53, so that the roof side airbag 53 inflates and deploys toward the roof lining 84.

When the roof side airbag 53 inflates and deploys, the roof side airbag 53 forces open the roof lining 84, and inflates and deploys through a space between the inner panel 114 and the roof lining 84 into the passenger compartment 11.

As described above, in the mounting bracket structure 63, of the first and second mounting brackets 151 and 152, the first mounting bracket 151 located above the forward middle pillar 22 constituting a part of the window frame is reduced in strength, and the reduced-strength first mounting bracket 151 is combined with the forward middle pillar garnish 165 (see FIG. 19) so as to be able to absorb an impact as well as the second mounting bracket 152 located off the forward middle pillar 22. Consequently, impacts applied to the first and second mounting brackets 151 and 152 are well absorbed, so that impact can be absorbed uniformly as a whole.

The above embodiment has been described with the example of the spirally rolled roof side airbag 53, but the way of folding the roof side airbag 53 is not limited thereto. For example, the roof side airbag 53 can be folded in an accordion shape.

Also, the embodiment illustrated with FIGS. 13 and 14 has been described with the example in which at the upper end portion 102a of the protector cloth 102, the two sewing portions 102b and 102c are sewn to the cover 91 with the first sewing threads 103, which is not limiting. It is alternatively possible to sew at least one of the sewing portions 102b and 102c to the cover 91 with the first sewing thread 103.

Obviously, various minor changes and modifications of the present invention are possible in the light of the above teaching. It is therefore to be understood that within the scope of the appended claims the invention may be practiced otherwise than as specifically described.

What is claimed is:

1. An occupant protection device for a vehicle having a longitudinally front seat, middle seat and rear seat in a passenger compartment, comprising:
    an inflator for generating gas; and
    a roof side airbag placed in a certain pillar space which is formed by a pillar garnish mounted to a passenger compartment side of a front pillar provided at a front part of a vehicle body, and in a longitudinally elongated certain roof space provided at a side corner of a roof on the passenger compartment side, to be inflated by the gas along side glasses toward the passenger compartment;
    wherein the roof side airbag comprises:
        gas inlets disposed in a longitudinally substantially middle portion to receive gas supply from the inflator;
        gas main passages extending longitudinally from the gas inlets along the roof space;
        a front bag portion to be inflated in a position corresponding to the front seat;
        a middle bag portion to be inflated in a position corresponding to the middle seat;
        a rear bag portion to be inflated in a position corresponding to the rear seat; and
        inner tubes placed in the gas main passages for distributing the gas to the bag portions,
        wherein the inner tubes include position stabilizing members longitudinally fitted in the inner tubes to maintain the shape of the inner tubes and prevent the fluttering of the inner tubes during the pulsating flow of the gas into the inner tubes,
        wherein the gas main passages communicate with the bag portions, and
        wherein the front bag portion includes an inflating portion in which, during inflation toward the passenger compartment along the side glasses, gas flowing in from the communicating gas main passage heads downward and then flows forward and upward.

2. The occupant protection device as set forth in claim 1 further comprising a supply pipe for supplying gas from the inflator to the roof side airbag, wherein at least one of the inflator and the supply pipe, and the roof side airbag are fastened together and mounted to the vehicle body by a bolt.

3. The occupant protection device as set forth in claim 1 further comprising: a cover for covering the roof side airbag in a folded condition; and a protector cloth sewn to the cover with a plurality of sewing threads for protecting the roof side airbag; wherein, the protector cloth is disposed at a location corresponding to a protrusion on the vehicle body; and of the sewing threads, the sewing thread at an area from which the folded roof side airbag inflates and deploys is weakened to be able to be torn by an inflating and deploying force of the roof side airbag.

4. The occupant protection device as set forth in claim 1, wherein the roof side airbag further comprises inner tubes placed in the gas main passages for distributing the gas to the bag portions; the inner tubes include discharge holes for distributing the gas to the bag portions; and the discharge holes are disposed at positions corresponding to openings formed in the bag portions, and are located upstream of flows of the gas from centers of the openings.

5. The occupant protection device as set forth in claim 1, wherein the roof side airbag further comprises a bridge, wherein the bridge connects portions of the roof side airbag near the gas inlets to each other.

6. The occupant protection device as set forth in claim 1 further comprising a plurality of mounting brackets for mounting the roof side airbag to the roof of the vehicle body; wherein, of the mounting brackets, the mounting bracket located above a pillar constituting a part of a window frame of the vehicle is reduced in strength, and the reduced-strength mounting bracket is combined with a pillar garnish provided at the pillar so that the impact absorbing capability of the reduced-strength mounting bracket and the pillar garnish is similar to that of the mounting bracket located off the pillar.

7. The occupant protection device as set forth in claim 1 further comprising: a cover for covering the roof side airbag in a folded condition; and a clip including a head disposed within the cover and an engaging portion protruding outward from inside the cover; wherein the engaging portion is engaged with the vehicle body.

8. The occupant protection device as set forth in claim 7, wherein the clip includes a holding portion provided at a proximal portion of the engaging portion and outside of the cover; and the holding portion is pressed from outside the cover toward the vehicle body to engage the engaging portion with the vehicle body.

* * * * *